United States Patent [19]

Mendell

[11] Patent Number: 4,519,032
[45] Date of Patent: May 21, 1985

[54] MEMORY MANAGEMENT ARRANGEMENT FOR MICROPROCESSOR SYSTEMS

[75] Inventor: Harry B. Mendell, New York, N.Y.

[73] Assignee: AT&T Bell Laboratories, Murray Hill, N.J.

[21] Appl. No.: 386,806

[22] Filed: Jun. 9, 1982

[51] Int. Cl.³ ............................................. G06F 15/16
[52] U.S. Cl. ................................................... 364/200
[58] Field of Search ................................ 364/200, 900

[56] References Cited

U.S. PATENT DOCUMENTS

| | | | |
|---|---|---|---|
| 3,377,624 | 4/1968 | Nelson et al. | 364/200 |
| 3,893,084 | 7/1975 | Kotok et al. | 364/200 |
| 3,905,023 | 9/1975 | Perpiglia | 364/200 |
| 3,916,385 | 10/1975 | Parmar et al. | 364/200 |
| 4,035,779 | 7/1977 | Birney et al. | 364/200 |
| 4,087,856 | 5/1978 | Attanasio | 364/200 |
| 4,104,721 | 8/1978 | Markenstein et al. | 364/200 |
| 4,177,510 | 12/1979 | Appell et al. | 364/200 |
| 4,298,934 | 11/1981 | Fischer | 364/200 |
| 4,307,448 | 12/1981 | Sattler | 364/200 |
| 4,328,542 | 5/1982 | Anastas et al. | 364/200 |
| 4,442,484 | 4/1984 | Childs, Jr. et al. | 364/200 |

OTHER PUBLICATIONS

Dec, *PDP11 Processor Handbook*, Digital Equipment Corporation, Ch. 6, "Memory Management", 1981, pp. 135-169.

*Primary Examiner*—Gareth D. Shaw
*Assistant Examiner*—Ronni S. Malamud
*Attorney, Agent, or Firm*—David H. Tannenbaum

[57] ABSTRACT

A memory management system is structured for use with a self-contained microprocessor to form a multi-user computer. The system operates to establish user and kernel modes each having different operating permissions. When the system is operating in the user mode, certain of the fixed functions of the microprocessor, such as interrupt-off and halt, are blocked from enablement by any user. The system is designed having multiple memory maps, some accessible when in the user mode and all accessible from the kernel mode.

32 Claims, 33 Drawing Figures

FIG. 5

MODE AND MEMORY MAP SELECTION

| ADDRESS LINES | | | | | KERNEL MODE | USER MODE |
|---|---|---|---|---|---|---|
| 19 | 18 | 17 | 16 | | | |
| 0 | 0 | 0 | 0 | (0) | K0 | K0 |
| 0 | 0 | 0 | 1 | (1) | K1 | ILLEGAL |
| 0 | 0 | 1 | 0 | (2) | K2 | ILLEGAL |
| 0 | 0 | 1 | 1 | (3) | K3 | ILLEGAL |
| 0 | 1 | 0 | 0 | (4) | K4 | ILLEGAL |
| 0 | 1 | 0 | 1 | (5) | K5 | ILLEGAL |
| 0 | 1 | 1 | 0 | (6) | K6 | ILLEGAL |
| 0 | 1 | 1 | 1 | (7) | K7 | ILLEGAL |
| 1 | 0 | 0 | 0 | (8) | U0 | U0 |
| 1 | 0 | 0 | 1 | (9) | U1 | U1 |
| 1 | 0 | 1 | 0 | (A) | U2 | U2 |
| 1 | 0 | 1 | 1 | (B) | U3 | U3 |
| 1 | 1 | 0 | 0 | (C) | EXIT KERNAL | U0 |
| 1 | 1 | 0 | 1 | (D) | MEM MNGMT RAM | U1 |
| 1 | 1 | 1 | 0 | (E) | ON BOARD I/O SELECT | U2 |
| 1 | 1 | 1 | 1 | (F) | POWER UP ROM | U3 |

PAGE DESCRIPTOR REGISTER

| BIT | FUNCTION |
|---|---|
| 15 | XX |
| 14 | PL6 |
| 13 | PL5 |
| 12 | PL4 |
| 11 | PL3 |
| 10 | PL2 |
| 9 | PL1 |
| 8 | PL0 |
| 7 | PAGE ACCESSED |
| 6 | PAGE WRITTEN INTO |
| 5 | XX |
| 4 | XX |
| 3 | EXPAND DOWN |
| 2 | WARNING ON |
| 1 | WRITE PERMISSION |
| 0 | READ PERMISSION |

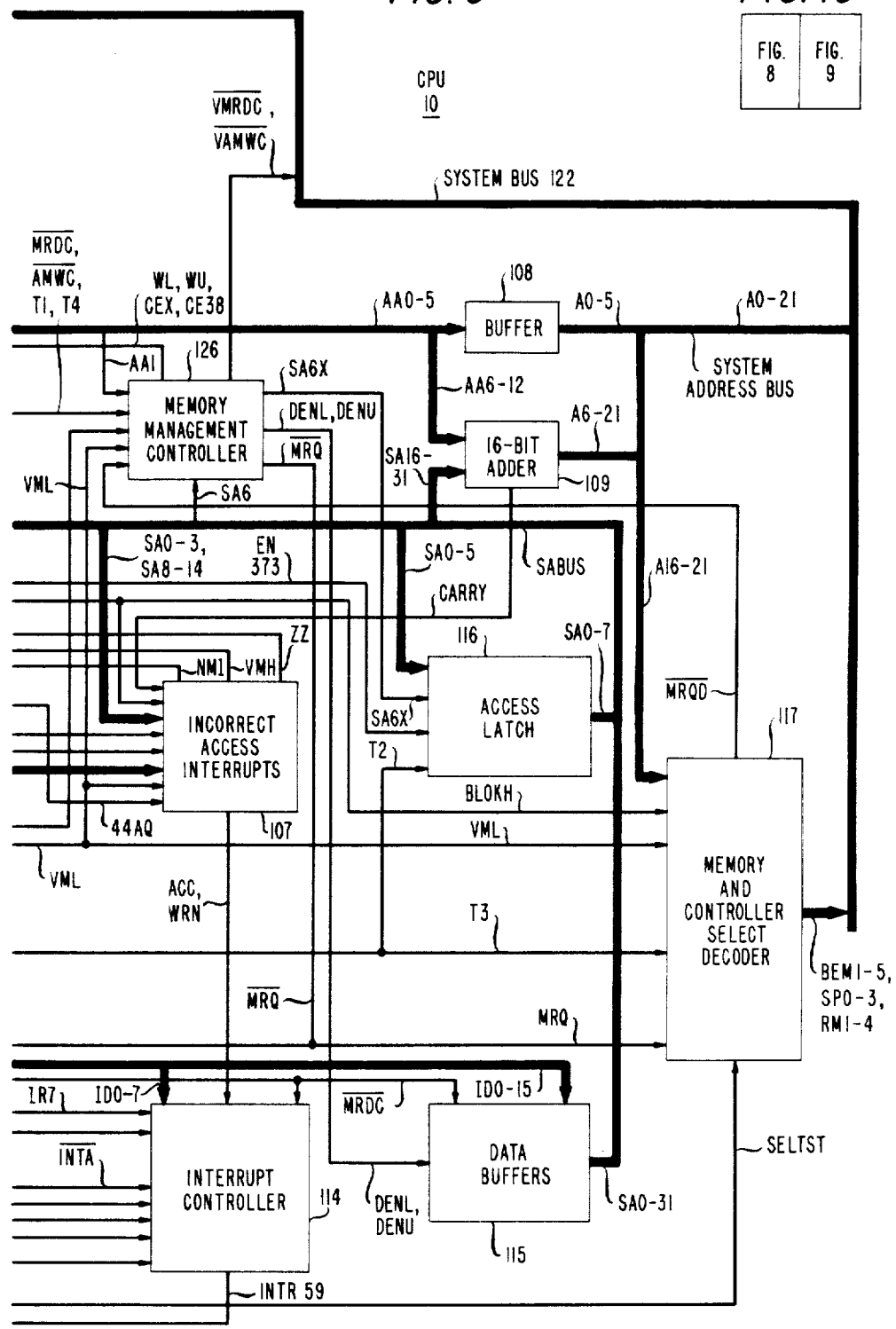

ADDRESS LATCH 102

OSCILLATOR 119

BUFFER 108

INTERVAL TIMER 113

I/O SELECT 118

ACCESS LATCH 116

DATA BUFFERS 112

MODE FLAG 121

INTERRUPT CONTROLLER 114

STATUS DECODER 103

MODE MAP 110

ROMs III

FIG. 25

MODE MAP ROM

| \multicolumn{5}{c|}{ADDRESS} | \multicolumn{8}{c}{DATA} |

| PSUP | AA19 | AA18 | AA17 | AA16 | K18 | USRGE | EXSUPER | VML | SEL I/O | EN38 | TEST | SELROM |
|---|---|---|---|---|---|---|---|---|---|---|---|---|
| 0 | 0 | 0 | 0 | 0 | 0 | 1 | 0 | 0 | 1 | 1 | 0 | 1 |
| 0 | 0 | 0 | 0 | 1 | 0 | 0 | 0 | 1 | 1 | 1 | 0 | 1 |
| 0 | 0 | 0 | 1 | 0 | 0 | 0 | 0 | 1 | 1 | 1 | 0 | 1 |
| 0 | 0 | 0 | 1 | 1 | 0 | 0 | 0 | 1 | 1 | 1 | 0 | 1 |
| 0 | 0 | 1 | 0 | 0 | 0 | 0 | 0 | 1 | 1 | 1 | 0 | 1 |
| 0 | 0 | 1 | 0 | 1 | 0 | 0 | 0 | 1 | 1 | 1 | 0 | 1 |
| 0 | 0 | 1 | 1 | 0 | 0 | 0 | 0 | 1 | 1 | 1 | 0 | 1 |
| 0 | 0 | 1 | 1 | 1 | 0 | 0 | 0 | 1 | 1 | 1 | 0 | 1 |
| 0 | 1 | 0 | 0 | 0 | 0 | 1 | 0 | 0 | 1 | 1 | 0 | 1 |
| 0 | 1 | 0 | 0 | 1 | 0 | 1 | 0 | 0 | 1 | 1 | 0 | 1 |
| 0 | 1 | 0 | 1 | 0 | 0 | 1 | 0 | 0 | 1 | 1 | 0 | 1 |
| 0 | 1 | 0 | 1 | 1 | 0 | 1 | 0 | 0 | 1 | 1 | 0 | 1 |
| 0 | 1 | 1 | 0 | 0 | 0 | 1 | 1 | 0 | 1 | 1 | 0 | 1 |
| 0 | 1 | 1 | 0 | 1 | 0 | 1 | 0 | 0 | 1 | 1 | 0 | 1 |
| 0 | 1 | 1 | 1 | 0 | 0 | 1 | 0 | 0 | 1 | 1 | 0 | 1 |
| 0 | 1 | 1 | 1 | 1 | 0 | 1 | 0 | 0 | 1 | 1 | 0 | 1 |
| 1 | 0 | 0 | 0 | 0 | 0 | 1 | 0 | 0 | 1 | 1 | 0 | 1 |
| 1 | 0 | 0 | 0 | 1 | 0 | 1 | 0 | 0 | 1 | 1 | 0 | 1 |
| 1 | 0 | 0 | 1 | 0 | 0 | 1 | 0 | 0 | 1 | 1 | 0 | 1 |
| 1 | 0 | 0 | 1 | 1 | 0 | 1 | 0 | 0 | 1 | 1 | 0 | 1 |
| 1 | 0 | 1 | 0 | 0 | 1 | 1 | 0 | 0 | 1 | 1 | 0 | 1 |
| 1 | 0 | 1 | 0 | 1 | 1 | 1 | 0 | 0 | 1 | 1 | 0 | 1 |
| 1 | 0 | 1 | 1 | 0 | 1 | 1 | 0 | 0 | 1 | 1 | 0 | 1 |
| 1 | 0 | 1 | 1 | 1 | 1 | 1 | 0 | 0 | 1 | 1 | 0 | 1 |
| 1 | 1 | 0 | 0 | 0 | 0 | 1 | 0 | 0 | 1 | 1 | 0 | 1 |
| 1 | 1 | 0 | 0 | 1 | 0 | 1 | 0 | 0 | 1 | 1 | 0 | 1 |
| 1 | 1 | 0 | 1 | 0 | 0 | 1 | 0 | 0 | 1 | 1 | 0 | 1 |
| 1 | 1 | 0 | 1 | 1 | 0 | 1 | 0 | 0 | 1 | 1 | 0 | 1 |
| 1 | 1 | 1 | 0 | 0 | 0 | 1 | 1 | 0 | 1 | 1 | 0 | 1 |
| 1 | 1 | 1 | 0 | 1 | 0 | 1 | 0 | 1 | 1 | 0 | 1 | 1 |
| 1 | 1 | 1 | 1 | 0 | 0 | 1 | 0 | 1 | 0 | 1 | 1 | 1 |
| 1 | 1 | 1 | 1 | 1 | 0 | 1 | 0 | 1 | 1 | 1 | 0 | 0 |

256 X 32 MEMORY MANAGEMENT RAM 106

16 BIT ADDER 109

MEMORY AND CONTROLLER SELECT DECODER 117

ADDRESS MULTIPLEXER AND
BLOKH GATING 104

MEMORY MANAGEMENT CONTROLLER 126

FIG. 33

| | | | |
|---|---|---|---|
| IC1 | OSCILLATOR | IC29 | DP8304 |
| IC2 | SN74393 | IC30 | SN74LS32 |
| IC3 | INTEL 8284 | IC31 | SN74LS32 |
| IC4 | SN74S04 | IC32 | DP8304 |
| IC5 | SN74S174 | IC33 | 74LS139 |
| IC6 | SN74LS00 | IC34 | INTEL 8253 |
| IC7 | SN74157 | IC35 | INTEL 8259A |
| IC8 | SN74LS373 | IC36 | SN74S138 |
| IC9 | 82S123 ROM | IC39 | SN74S260 |
| IC10 | INTEL 2732-B | IC43 | 74LS11 |
| IC11 | INTEL 8086 | IC44 | SN74S112 |
| IC12 | SN74LS373 | IC45 | SN74S138 |
| IC13 | INTEL 2732-A | IC46 | 74LS02 |
| IC14 | SN74LS373 | IC47 | AM25LS2517 |
| IC15 | DP8304 | IC48 | SN74S138 |
| IC16 | INTEL 8288 | IC49 | SN74S381 |
| IC17 | DP8304 | IC50 | SN74S136 |
| IC18 | SN74S158 | IC51 | SN74S381 |
| IC19 | 8 BIT x 256 50NS RAM | IC52 | SN74S85 |
| IC20 | SN74LS373 | IC53 | SN74S85 |
| IC21 | SN74S158 | IC55 | SN74S381 |
| IC22 | 8 BIT x 256 50NS RAM | IC56 | SN74S182 |
| IC23 | DP8304 | IC61 | SN74LS112 |
| IC24 | SN74S157 | IC62 | SN74S112 |
| IC25 | 8 BIT x 256 50NS RAM | IC63 | DP8304 |
| IC26 | DP8304 | IC64 | DP8304 |
| IC27 | SN74S508 | IC67 | SN74LS373 |
| IC28 | 8 BIT x 256 50NS RAM | IC68 | SN74365 |
| | | IC69 | S74LS02 |

MEMORY MANAGEMENT ARRANGEMENT FOR MICROPROCESSOR SYSTEMS

BACKGROUND OF THE INVENTION

This invention relates to a multi-processing computing system and more particularly to such a system founded upon a single-user microprocessor.

Multi-user and multi-purpose computing systems are now well known and widely used for many applications. Typically these systems have an operating system for controlling the functions of the machine in response to user instruction sets, called programs. The operating system, of which the UNIX (trademark of Bell Telephone Laboratories) operating systems is but one of many, resides or runs on a host computer.

One characteristic designed into the host computer is the ability to handle multiple users on a time shared basis. This characteristic, while appearing simple to the user, is in fact a complex system which serves many purposes, such as, for example, keeping one user's files separate from another user's files.

Another example of such multi-process computers is the ability of the host computer to prevent one user's programs from interfering with the programs of another or with the operating system itself. One typical example of the complexity is the inherent ability of the computer to prevent any user program from gaining control of the computer to such an extent that no other user could gain access thereto. Another typical example would be the ability of the host computer to prevent a user from destroying or erasing a disk file or memory due, possibly to a faulty command, or even due to a purposeful instruction.

Another set of problems revolves around the question of memory space allocation, protection and control. The addresses to which a user's data is to be written resides on internal registers in the microprocessor. Each user's program has complete control over these registers, and consequently, one user's data could be written into the memory space used by another user.

While large computers have solved many of these problems there exists a number of microprocessors, which because they are designed for single users, do not possess the inherent capability of managing memory space between users or preventing the user from inadvertently, or willfully, taking unauthorized action.

The problem is compounded in that these microprocessors are designed with simplicity in mind and with specific input/output capability via certain preestablished leads and all communication to or from the microprocessor must be via commands (0 or 1) on these specific leads. Thus, there is required a circuit for configuring such single user microprocessors to accomplish multi-processing and multi-user operations without necessitating a change in the standard microprocessor and without adding inordinate overhead in the form of software control or protection circuitry.

SUMMARY OF THE INVENTION

I have solved the microprocessor multi-user problem by recognizing that certain pre-established address leads from the microprocessor may be used, in conjunction with a mode map and the microprocessor's interrupt system, to control two basic operating modes. These modes, which are the user mode and the kernel mode, serve to prevent a user from controlling critical computer functions, such as turning off the interrupt control or placing the computer in the halt mode.

These modes also facilitate memory protection. Memory management provides twelve memory maps, each of which defines a memory space of up to 64K bytes. The definition of the 64K byte memory space is further subdivided into eight, 8K byte segments which can be located on any 64 byte boundary in memory, and can be configured for read access, write access, or both and can be any length in units of 64 bytes, up to 8K bytes. Of the twelve memory maps, only five are allowed to be accessed with the memory management flag set to the user mode. Furthermore, the contents of memory maps themselves are only accessible when the memory management flag is set to the kernel mode. The use of the flag in this manner allows complete protection of memory during the operation of a user's program.

I have accomplished this result by designing a circuit operating in conjunction with a standard microprocessor and responding to the mode map to allow only certain functions to be performed by a user in the user mode. Other functions, which are critical to the computer operation, and if performed improperly would cause great harm, are only performed in the kernel mode. The kernel mode can only be entered under certain conditions and under strict preprogrammed control using interrupts which vector into secure service routines.

Thus, when a critical operation must be performed, for example, reading a disk, the user program makes a call for disk access by executing a software interrupt instruction with the address of a pre-established kernel program. When this occurs, the system goes into the kernel mode, the user loses control, and the called kernel program (which is theoretically free of errors) performs the desired function in a prescribed fashion.

If the system is in the user mode and the user program sends an unauthorized command, such as the interrupt turn-off command (which would prevent any other user from gaining access to the computer), the system responds by turning the interrupt back on. If for some reason the interrupt capability must be turned off for a valid purpose (such as the beginning of an interrupt service routine) then such a command must come to the processor from a program running in the kernel mode. When this occurs, the interrupts will remain off under control of the kernel program.

My system uses a large set of dynamically rearrangeable memory maps which facilitates moving between different memory spaces, e.g., user instructions, kernel data and kernel instructions thereby making the system more efficient and easier to program. These memory maps are entered under control of bits on the above-mentioned pre-established address leads and the mode map and the user/kernel flag. The kernel mode can use all memory maps while the user mode is restricted to certain sets and the memory maps can only be changed while in the kernel mode.

The switch from user to kernel mode is coupled to the microprocessor's interrupt system so that the only way the mode can change from user to kernel is via an interrupt sequence, which vectors into a secure service routine in the operating system. I have designed a circuit which accomplishes a secure transition from user to kernel mode by triggering the transition to kernel mode from the microprocessor's interrupt sequence, and by guaranteeing that any reads or writes taking place during this critical transition function properly and do not jeopardize the security of the system.

BRIEF DESCRIPTION OF THE DRAWING

The invention and its several other objects, features and advantages will be more fully understood from a reading of the following description to one embodiment taken in conjunction with the drawing in which:

FIGS. 4–7 show the memory map address control;

FIGS. 8 and 9 show a schematic of my invention;

FIG. 10 shows how FIGS. 8 and 9 are arranged;

FIGS. 11–32 show specific details of the various elements shown in FIGS. 8 and 9; and FIG. 33 is a chart showing the manufacturer's part numbers of the various ICs.

GENERAL DESCRIPTION

Figure 1:
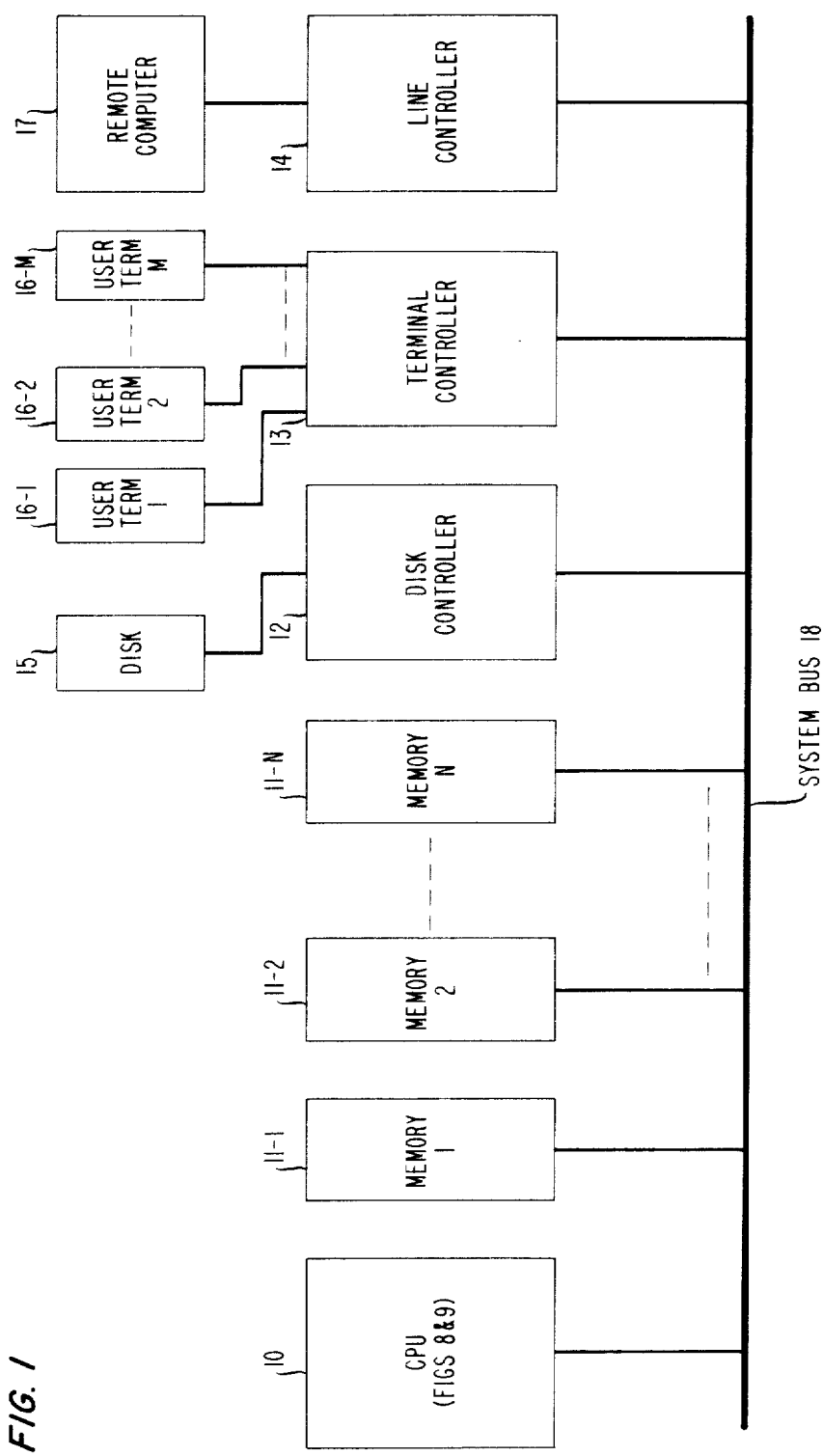
FIG. 1 shows a system in which my invention may be used.

FIG. 1 shows a typical use of the invention in a multi-processing computer system. The invention is used within CPU 10. CPU 10 is interfaced to the system via the system bus 18 and is shown with four memory boards 11-1, 11-n. Disk 15 is interfaced to CPU 10 via disk controller 12. User terminals 16-1, 16-2 are interfaced via terminal controller 13. Similarly, remote computer 17 may be interfaced via line controller 14.

Figure 2:
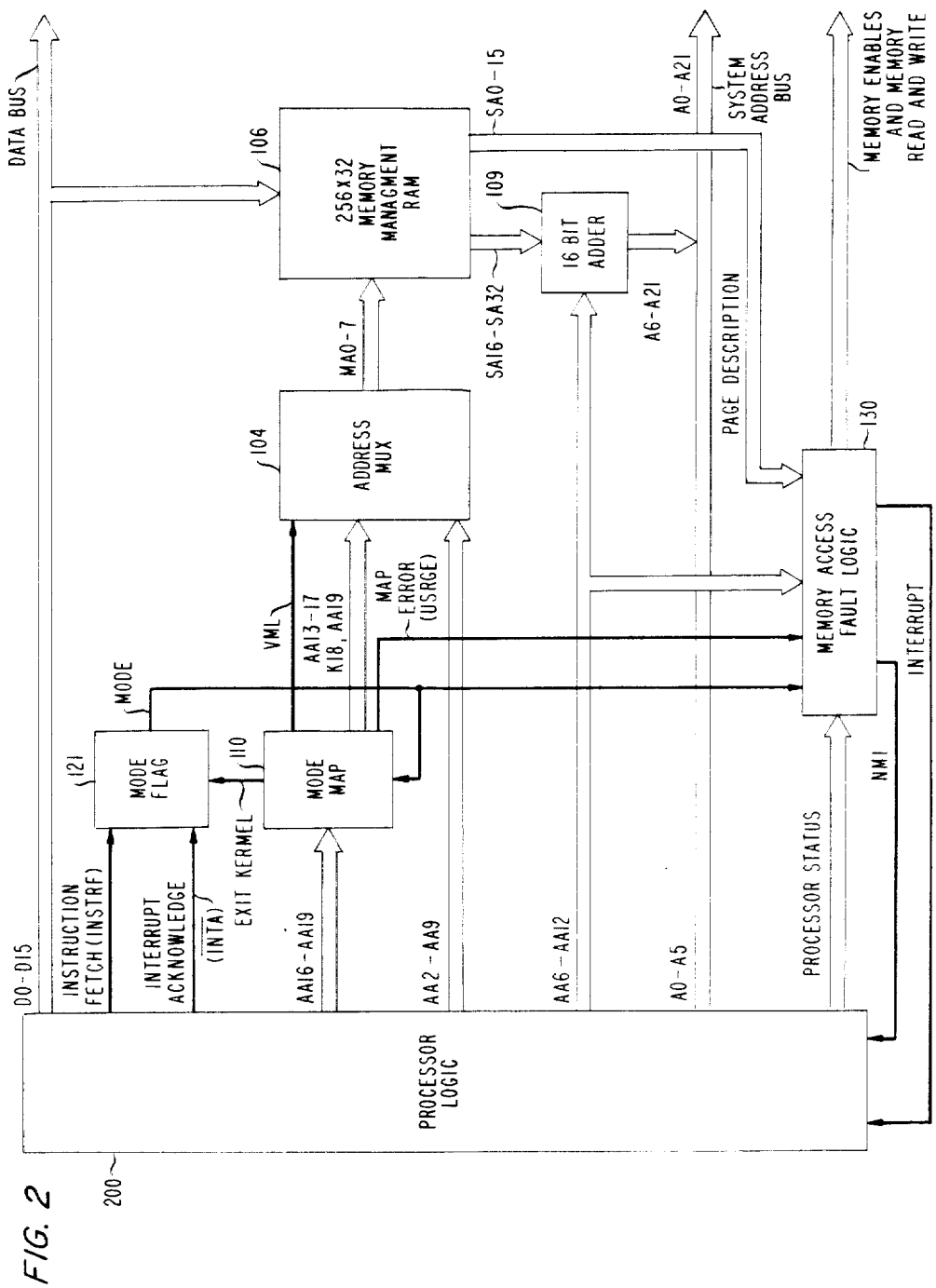
FIG. 2 shows a block diagram of the basic elements of my invention.

As shown in FIG. 2, main system processor 200 is a 16-bit CPU which contains a clock generator, bus controller, interrupt controller, timer, bus drivers and latches. This processor may be the Intel Corporation 8086 microprocessor. The processor address and data buses are connected to 2 ROMs (not shown in FIG. 2) which provide power-up test and bootstrap programs. Two universal synchronous/asynchronous receiver/transmitters (USARTs) (also not shown in FIG. 2) are connected to the data bus to provide serial I/O ports for loading and testing.

The processor may operate in a privileged mode called kernel mode, or in a restricted mode called user mode. The mode that the processor is in is controlled by mode flag 121, FIG. 2. When the processor is turned on or reset, the mode flag is set to kernel mode and the processor vectors to a predetermined starting address in the power up read-only memory (ROM—not shown in FIG. 2). The ROMs contain programs to test the correct operation of the system shown in FIGS. 8 and 9 and then transfer the operating system from the system disk to the system memory. Before this transfer takes place, memory management RAM 106 must be written to permit access to the disk and to the system memory.

After the interval timer, interrupt controller and USARTs and the memory management RAM are initialized, the operating system will be transferred to main system memory and then the operating system will start executing. Mode map 110 interprets address bits AA16-∝AA19 from processor 200. Based on the bits present on those lines, the mode map either selects a specific translation table from management memory RAM 106, or selects access to certain devices which will be detailed later. Mode map 110 also gives the command when necessary to the mode flag to change from kernel mode to user mode. The mode map will do this upon receiving the bits 1100 on address lines 19, 18, 17, and 16, respectively. When mode map 110 selects a particular section of memory management RAM 106 to use for translation, it first checks the mode flag and compares the mode with the area of the memory management RAM that is selected to insure that if the mode flap is set to the user mode, that it is the user area that has been selected from memory management RAM 106.

It is important to note that although a specific address 1100, on lines AA19–AA16, causes the mode flag to go from kernel to user mode, the transition from user to kernel mode takes place by an entirely different mechanism. Using the address lines to switch back from user to the kernel mode is not feasible because the address lines are in complete control of whatever program happens to be executing, and a user program could therefore change to kernel mode at any time. The memory management system is designed so that the transition from user mode to kernel mode can only occur concurrently with an interrupt vector to a predetermined area in the operating system which insures that any change to kernel mode will be accompanied by a control transfer to the operating system. Thus, a mechanism is used which allows switching from user to kernel mode in a manner which puts the operating system in control immediately after the mode is changed to kernel mode.

The system contains a 256×32-bit RAM 106 which stores page address and page descriptor information as will be discussed in more detail hereinafter. The circuitry maps the 20-bit virtual address outputs of the processor into a physical address space of 22 bits. Sixteen bits (SA16–SA31) from the RAM are added to seven bits (AA6–AA12) from the processor output address and the result is combined with the lower six bits (A0–A5) from the processor output address to form a 22-bit physical address (A0–A21) the system address bus. The other 16 bits (SA0–SA15) from the RAM go to memory access fault logic 130 and are used to control read/write signals and to generate interrupts on illegal reads/writes or on attempted accesses to memory that is out of the allocated address range.

Processor 200 contains an interrupt input, expanded into a number of interrupt inputs by the interrupt controller (not shown in FIG. 2), which operates, upon receipt of a signal, to cause the processor to respond to particular preprogrammed routines under control of an interrupt program. When such an interrupt occurs, control is taken away from the program instructions currently running in the processor and given to the selected interrupt program. In simplest form, the interrupt signal forces a jump from the instruction set currently being executed to a new instruction set by providing a particular address on its output address bus. This forced address points toward a priorly written set of instructions contained in main memory. These interrupt routines are important for many reasons, such as for servicing memory management access violations, input/output devices, and the system clock.

The processor also has the capability of responding to a command that halts all further processing. Another command will cause the interrupt inputs to turn off so that an executing program cannot be interrupted, even by the system clock. Simply disabling the interrupt turn-off feature is not feasible since this function is built into the basic structure of the microprocessor.

As will be seen, the system is designed to only allow the interrupts to be turned off and the halt command given from the kernel mode, where, presumably, an adequate program has been written to protect the system.

Figure 3:
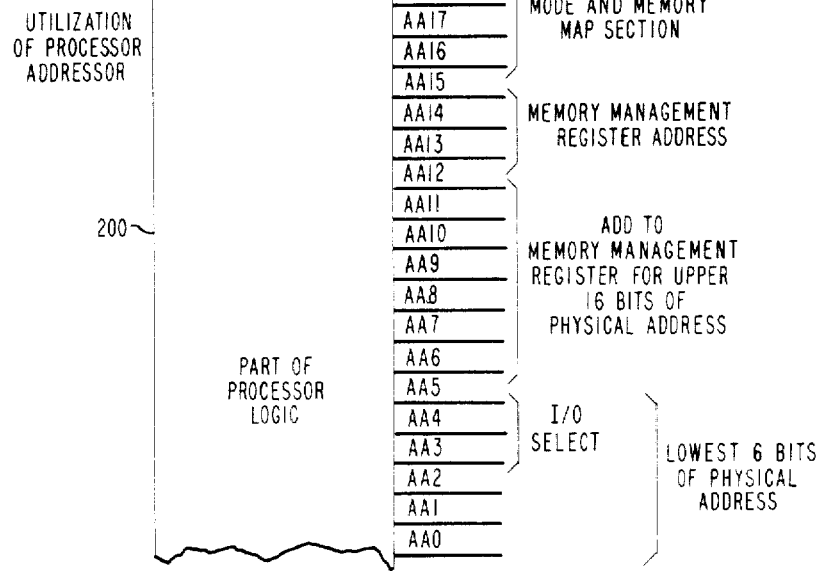
FIG. 3 shows a portion of the processor showing certain address leads.

FIG. 3 shows the utilization of processor 200 output addresses. Address lines AA19–AA16 are decoded by the mode map, as will be discussed more fully hereinafter, and are used to select one of twelve memory maps for accessing external memory, to exit from kernel mode into user mode, to directly access the memory management RAM, to directly access certain devices, or to access the power-up ROMs.

GENERAL DISCUSSION OF FIGS. 8 AND 9

Figure 8:
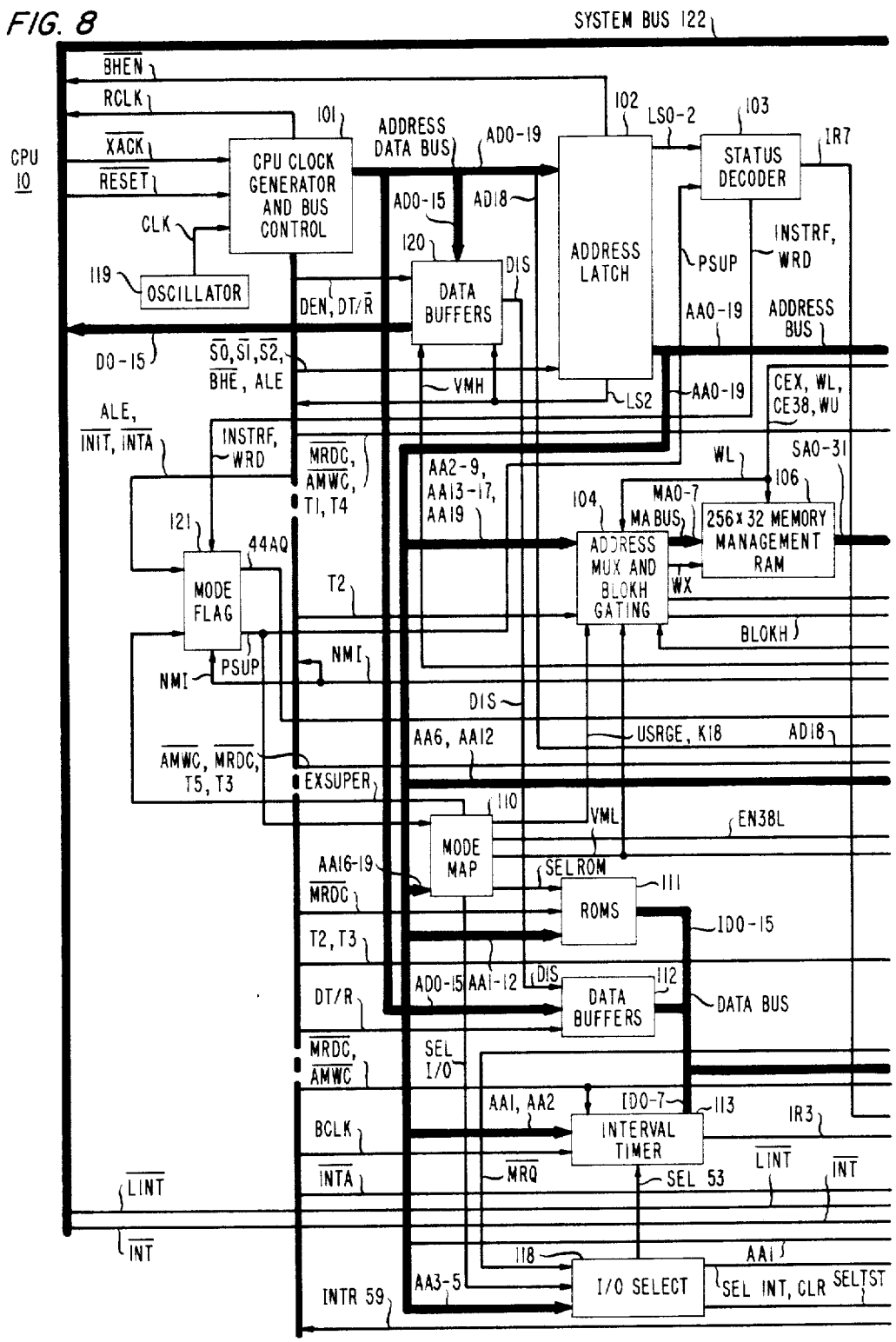

As shown in FIG. 8, in simplest form, microprocessor 101 operates from instructions provided to it via a plurality of inputs and operates on data supplied under control of the input information to provide new data on its output leads. The output data is controlled by a set of twenty leads shown as AD0–AD19. AD0–AD15 form a multiplexed address/data bus, and AD16 to AD19 form an additional address bus. The address latch 102 latches the address from the multiplexed bus, forming the demultiplexed address bus A0–A5, AA6–AA19. Bits (1's and 0's) on the leads of this address bus point the system toward a virtual address in main memory. This virtual address must then be translated by the memory management circuit into a specific address location within the main memory. Four of these address leads, namely leads AA16–AA19, are input to mode map 110 and select one of twelve memory maps which permit access to system memory, the power up ROM 111, memory management RAM 106, interrupt controller 114, interval timer 113 and USARTs (not shown). As discussed, these bits serve to change the mode flag 121 from kernel to user mode.

When the system is in the user mode, any attempt to turn off the processor interrupts will result in the interrupt being turned back on, and any attempt to halt the processor will result in the processor being immediately restarted with the appropriate warning message returned to the user. The manner in which this is controlled will be discussed hereinafter.

Figure 4:
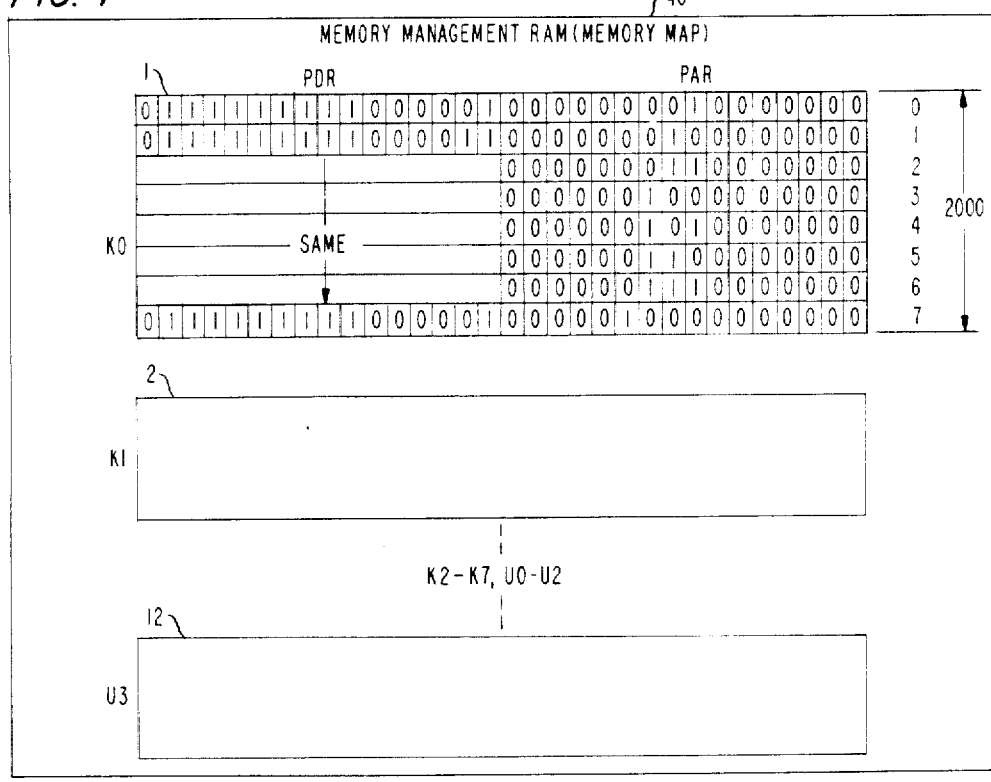

The processor contains twelve maps which control the fields within which the processor may store and retrieve data. Thus, as shown in FIG. 4, memory management control consists of twelve individual fields (K0–K7 and U0–U3) with the particular field being selected by mode map 110 and the particular word within the memory management RAM 106 being controlled by address bits A15, A14, A13 and A12 as priorly discussed. Each of the words within each of the fields contain a 16-bit PDR field and a 16-bit PAR field. These fields in conjunction with the memory address bits provide a direction to a specific location within the main memory. Each field may be assigned to store a specific type of information. Thus, field K1 can store kernel programs, field K2 could store kernel data, while U0 (not shown) could store user's programs, field U1 (not shown) user's data. The particular field and mode is controlled in the manner to be more fully discussed by bits from address lines 19–16. This decoding is shown in FIG. 5. These four bits are decoded and allow access to the selected field and to switch the mode of the system from kernel to user mode.

TYPICAL OPERATION

Assume now that the system has just been turned on, and that the reset signal has been sent to microprocessor 101. The microprocessor responds by jumping to a predetermined address that has the bits 1, 1, 1, 1 in address lines 19, 18, 17, and 16. Concurrently, the reset signal has set mode flag 121 to kernel mode. The bits 1, 1, 1, 1 in AA19, AA18, AA17, and AA16 at the output of latch 102 will cause mode map 110 to select the read-only memories 111 (ROMs). The remaining bits on address lines AA15–AA0 will point to the beginning of the power-up routine located in ROMs 111. Mode map 110 will also put a 1 on line VML because the memory access will be internal to the CPU system and not go on the system bus. A 1 on lead VML causes all external signals to other memory boards to be suppressed, disables the translation from virtual to physical address, and disables the access checking by the page descriptor register in the memory management RAM.

The program in the ROMs first verify the correct operation of the CPU system by performing self-tests on critical CPU system functions. If the self-tests indicate the CPU system is operating properly, the program in the ROM next loads a program from the disk unit to main system memory, and continues to load programs until the entire operating system is present in main system memory. However, before main system memory or disk may be accessed, the memory management RAM 106 must be loaded with the base addresses and access permissions for the system memory that is to be accessed. The memory management RAM may only be written to or read from when the mode flag is in kernel mode. To directly write to or read from the memory management RAM, address lines AA19, AA18, AA17, and AA16 must contain the bits 1101 (FIG. 5).

When mode map 110 detects the bits 1101 on address lines AA19, AA18, AA17, and AA16, it puts a 0 on the line EN38L, which enables access to memory management RAM 106. It also puts a 1 on lead VML which as discussed before disables external access, but in addition, causes address multiplexer 104 to allow address bits AA2–AA9 to access the memory management RAM instead of having the RAM accessed by address lines AA13–AA17, K18 (from the mode map as will be discussed) and AA19 as is normally done during a virtual to physical memory translation. Multiplexing the addresses in this manner permits sequential access to the memory management RAM. It should be noted that memory management RAM 106 is accessed in two distinctly different ways. It is accessed during every virtual to physical address translation, to look up information required for calculating address and checking access permission. Memory management RAM is also accessed directly by a kernel program during the initialization and updating of the memory management RAM. Memory management control 106 configures the memory management RAM for either type of access. Both the timing, and the data width, which is 32 bits for the translation and only 16 bits for individual access, must be configured. The timing and control signals for these buffers are controlled by memory management control 106. Furthermore, there are two bits in each 32-bit word of the memory management RAM which are used to indicate whether or not that segment has been accessed and how it has been accessed. Whenever one of those segments is used for an address translation, the access bit, bit 7, is set in the page descriptor register as an indication that the corresponding segment of memory has been used at least once. There is also a bit of the PDR, bit 6, which is used to indicate that the corresponding segment of memory has been written into.

To achieve this, the memory management RAM must be read, modified, and written back to, during an address translation. The temporary data for this is stored in accesss latch 116. Note that only eight bits need to be latched because it is only the lower byte of the memory management RAM which is modified in this manner. The timing for this operation is also controlled by memory management control 106.

Before the operating system can be started, the interval timer 113 and the interrupt controller 114 and the USARTs (not shown) must be initialized. These devices are selected by putting bits 1110 on address lines AA19, AA18, AA17, and AA16 (FIG. 5). The mode map takes these bits and enables access to the I/O devices. These I/O devices are only accessible when the mode flag is in kernel mode. When all the I/O devices and the memory management RAM are initialized, the operating system starts execution and control is transferred to a user program. The details of this transfer will be discussed hereinafter.

Assume now the system is in the user mode, and a set of bits is provided from processor 101 onto the address bus shown in FIG. 3. Bits AA16-AA19 are used by mode map 110, in the manner shown in FIG. 5 to select one of the maps within memory management control 106.

Since the mode flag is set to user mode, the mode map will only permit access to user maps U0, U1, U2, U3 and K0, which is used by both user and kernel modes. If one of the other maps or devices is selected, the signal USRGE (FIG. 8) is generated by mode map 110. The USRGE signal goes to address multiplexor and block gating circuit 104, which will generate the BLOKH signal. The BLOKH signal will cause the access to be blocked by suppressing the enables from decoder 117. The BLOKH signal will also cause interrupt controller 114 to generate an interrupt to CPU 101. CPU 101 will respond to the interrupt with an interrupt acknowledge signal. This interrupt acknowledge signal causes the mode flag to change from user to kernel mode. At the same time, CPU 101 will vector to an interrupt service routine which will process the error, notify the user of the incorrect access attempt and turn control over to another user program.

Figures 6, 7:
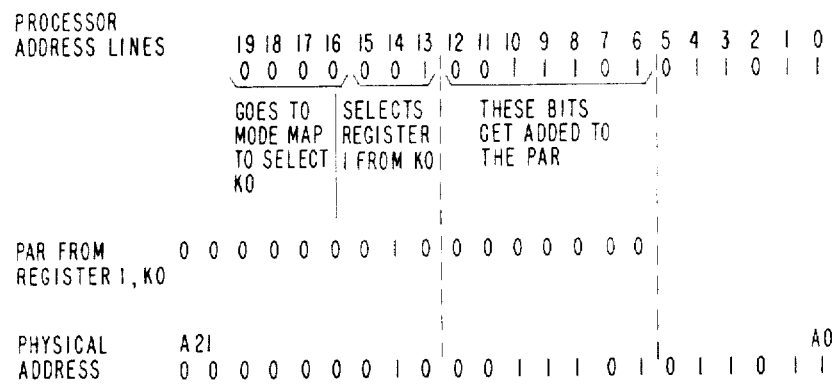

Now assuming a proper memory map is selected, the 16 page address register (PAR) bits are used to determine the exact physical location within the main memory where the next memory access is to be made. FIG. 4 shows a typical memory map in K0, and many other such maps may be constructed. This is accomplished by providing bits AA12-AA6 from the address bus to 16 bit adder 109 as shown in FIG. 7. These bits are summed with bits 6-0 of the PAR from the selected mode map. A 22-bit physical address (A0-A21), containing summed bits A21-A6 plus address bits 5-0 from processor 101, is provided on the system address bus to system memory and controller boards.

As shown in FIG. 4, each word of the memory management RAM contains a 16 bit page descriptor register (PDR) word, the individual bits of which are used to control the function to be performed in accordance with the chart shown in FIG. 6.

The page descriptor register is compared with the attempted memory access to determine whether or not the memory access is valid. This comparison is done by the section labeled incorrect access interrupts 107, FIG. 9. If the memory access is a read operation, the incorrect access interrupt section checks to see if read permission is present on the page descriptor register. Similarly, if the memory access is a write operation, write permission is checked. In addition to checking read permission and write permission, the address of the memory access is compared with the page length field in the page descriptor register to verify that it is within the range of memory which has been allocated in the page descriptor register. If any errors are detected, the signal ZZ coming out of the incorrect access interrupt section 107 is generated.

Signal ZZ goes to address multiplexor and block gating circuit 104, which upon receipt of the ZZ signal generates the BLOKH signal as it did in the previous example when it received the USRGE signal from mode map 110. The BLOKH signal causes board decoder 117 to suppress the board enable which will stop the memory access from taking place and will also issue the incorrect access interrupt signal to interrupt controller 114 which in turn will interrupt CPU 101.

As before, CPU 101 will respond with an interrupt acknowledge signal which causes the mode flag to change from user to kernel mode and at the same time the CPU vectors to an interrupt service routine which will take appropriate action and return control to another user program.

Before control is returned to another user program, the operating system must return the mode flag to user mode. This is accomplished by putting the bits 1100 in address lines AA19, AA18, AA17 and AA16 with the virtual address of the new user program on the remaining address lines. The mode map will detect the 1100 pattern (FIG. 5) and cause the mode flag to switch to user mode. When the mode flag is in user mode, any interrupt to interrupt controller 114 will result as discussed in an interrupt acknowledge which will cause the mode flag to go from user to kernel mode and the CPU will vector into an interrupt service routine. If the interrupt is caused by an access error or a memory parity error, appropriate action will be taken such as terminating that user's program and going to a different user's program.

Most interrupts will not be error conditions, but will be part of the normal operation of the system. For example, interval timer 113 periodically interrupts the processor every 1/60th of a second. This interrupt is used to keep track of the time and is also used by the operating system to check the status of all user programs, and based on CPU utilization per user, may cause a switch from one user to another.

There are also two interrupt lines which go to the processor from other parts of the system. One is the low priority interrupt called LINT and the other is the high priority interrupt called INT. These interrupt lines may be asserted by external input/output devices, such as the system disk via the disk controller, user terminals via the terminal controller, or communication to another processor via the line controller. These controllers are shown in FIG. 1.

In the event of the receipt of one of these interrupts, the interrupt controller sends an interrupt to the CPU which responds with an interrupt acknowledge which causes the mode flag to change from user to kernel mode and then the CPU will vector into an appropriate service routine. In the case of an interrupt from an input/output device, the CPU will process the request while in kernel mode and then return control to the user program or to a different user program depending upon CPU utilization and other factors.

If an input/output interrupt occurs while the mode flag is in kernel mode, a vector will take place to the same interrupt routine as before. There is no need to change the status of the mode flag in this case. However, if an access error occurs while the mode flag is in kernel mode, this indicates a serious condition since no access errors should be made by the operating system since it is considered to be secure. In this case a special panic service routine will be entered which will attempt to either halt the system and wait for service or to restart operation of the operating system.

SYSTEM OPERATIONS BY USER

If the user wishes to perform a function, such as write to a disk, which function has been pre-identified as one only accessible from the kernel mode, the user would call the proper kernel program by a high level system call.

A user performs a system call by storing a specific number which represents the type of system call requested. This number is stored in an area of memory referred to as the user stack. Then the user executes the INT instruction which causes the interrupt-off bit to be present. This is detected by the incorrect access interrupt unit 107 as discussed priorly. Interrupt unit 107 will send a non-maskable interrupt to microprocessor 101 which causes the microprocessor to jump to the beginning of the non-maskable interrupt service routine which will examine the user stack, see what system call has been requested, perform the request, and return control to the user program.

The status leads from the microprocessor are decoded by status decoder 103 and the halt and interrupt off status conditions are compared against the mode status bit of memory management control 106. If, for example, the "interrupt off" bit is present during a time when the system is in the user mode, this condition is detected by the incorrect access interrupt unit 107, and a signal is provided to the non-maskable interrupt (NMI) input of microprocessor 101. This NMI forces the microprocessor to jump to a specific address, which is the beginning of the NMI service program. After the NMI and before fetching the first instruction of the NMI service program, the mode flag is switched from user to kernel mode. This allows the NMI service program to be accessed, which program resides in an area of memory only accessible through a kernel memory map. Mode map 110 will only permit access to the kernel memory maps when the mode flag is set to the kernel mode.

The NMI service program then determines the cause of the interrupt being turned off. These causes fall into two classes, system calls and improper interrupt masking. In the case of a system call the user program is requesting action to be taken by the operating system and the attention of the operating system is obtained by intentionally turning the interrupts off. In the case of an improper interrupt mask the user program would turn the interrupts off without making a proper system call. After the NMI service program determines the cause of the interrupt mask, it branches to the proper handling routine in the operating system which services the request, if a request exists, and turns the interrupts back on.

It should be seen that because the system has twelve stores within memory management control 106, and because the system has a status flag to control the user and kernel mode, it is possible while in the kernel mode for the mode map to point towards a store where user data is stored. This then allows a program in the kernel mode to access any of the data necessary, without reloading the memory management RAM from the main memory or using special instructions as is done in prior systems.

DETAILED DESCRIPTION—FIGS. 11-32

The following description is keyed to the various circuit blocks, the functions of which were described in conjunction with FIGS. 8 and 9 and are provided to show one implementation of my invention. Other implementations are certainly possible.

Figure 12:
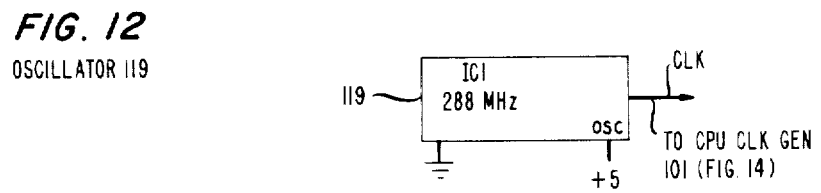

The main clock for the board is provided by a 12.288 or 14.7456 mHz(F) oscillator IC1 as shown in FIG. 12. This clock is counted down by IC2 (FIG. 14) to provide a clock/4 rate RCLK to other memory boards through buffer IC43 and a clock/8 rate BCLK to the interval timer IC34, FIG. 15, and the USARTs (not shown). Oscillator IC1 clocks the HEX flip-flops, IC5, FIG. 14, which are wired as a shift register. The T1 signal is a clocked version of the address latch enable signal ALE used to latch the microprocessor addresses. Signals T2-T5 are delayed versions of signal T1 with an approximately 60 ns delay between successive signals. The main clock also serves as the external frequency source for the clock generator and driver chip, IC3, FIG. 14. This circuit divides the frequency by 3 and provides an F/3, ⅓ duty cycle, clock to microprocessor IC11 and bus controller IC16.

The reset logic and ready synchronization for the microprocessor is supplied by IC3. The reset logic provides a Schmitt trigger input (RES) and a synchronizing flip-flop to generate the reset timing. The input signal is generated either by reset=0 from the backplane or, from the R1C9 combination on power up. The reset signal is synchronized to the falling edge of the clock out of reset logic IC3. The ready output of reset logic IC3 is an active high signal which is the synchronized version of the RDY1 input. Since the input can occur asynchronously with respect to the processor clock, it is necessary to synchronize it before presenting it to the processor to insure that it meets the required set up time. Reset logic IC3 does this job and also guarantees the required hold time before clearing the ready signal.

Microprocessor IC11 has a 16-bit address/data bus, an additional 4-bit address bus and a 3-bit status bus. The status bits S0, S1 and S2 from IC11 are latched and decoded by the bus controller IC16 to provide control signals, address latch enable ALE, memory read command MRDC, advanced memory write command AMWC, interrupt acknowledge INTA, and data transmit receive DT/R.

Figure 17:
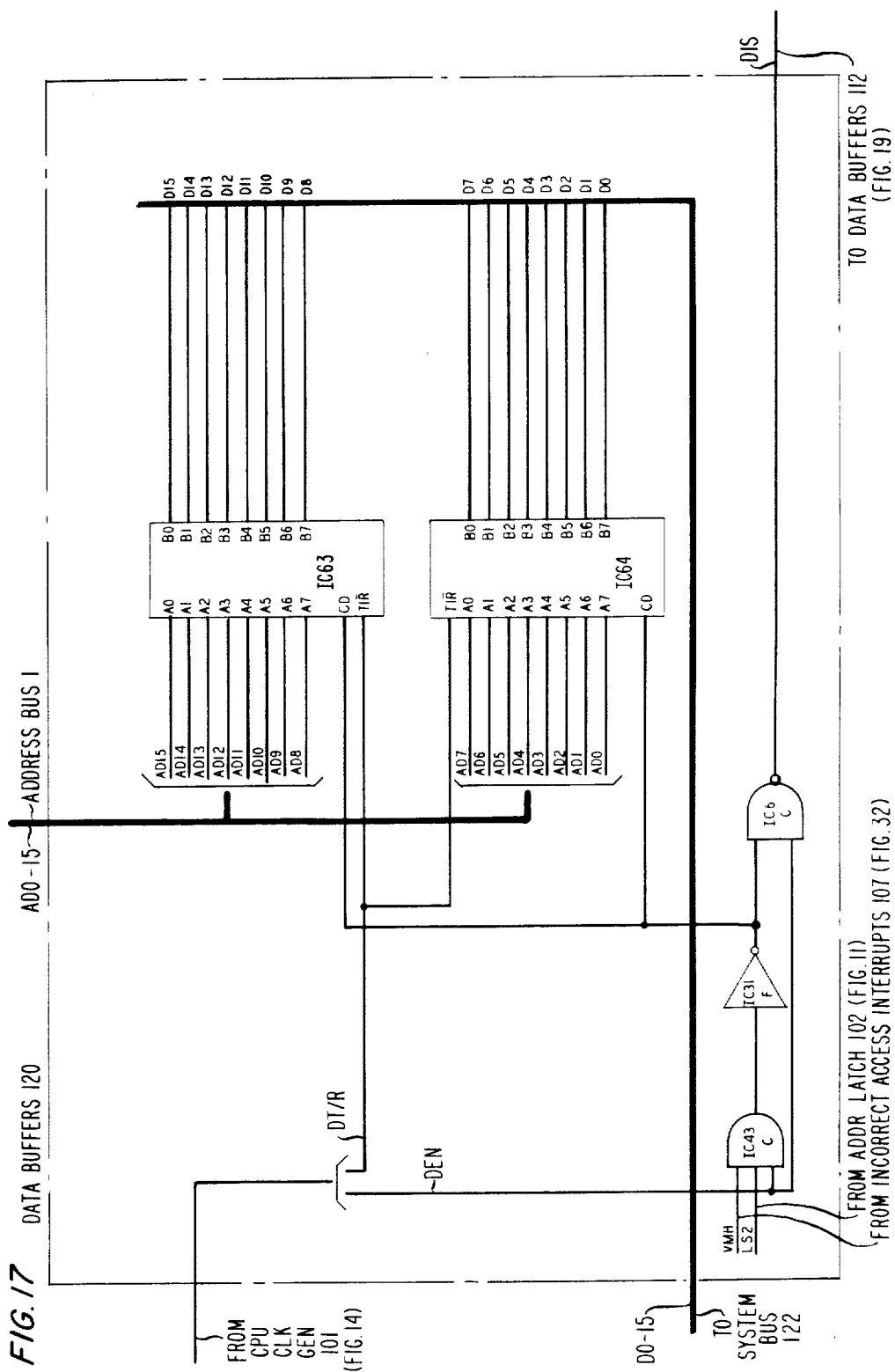
Figure 19:
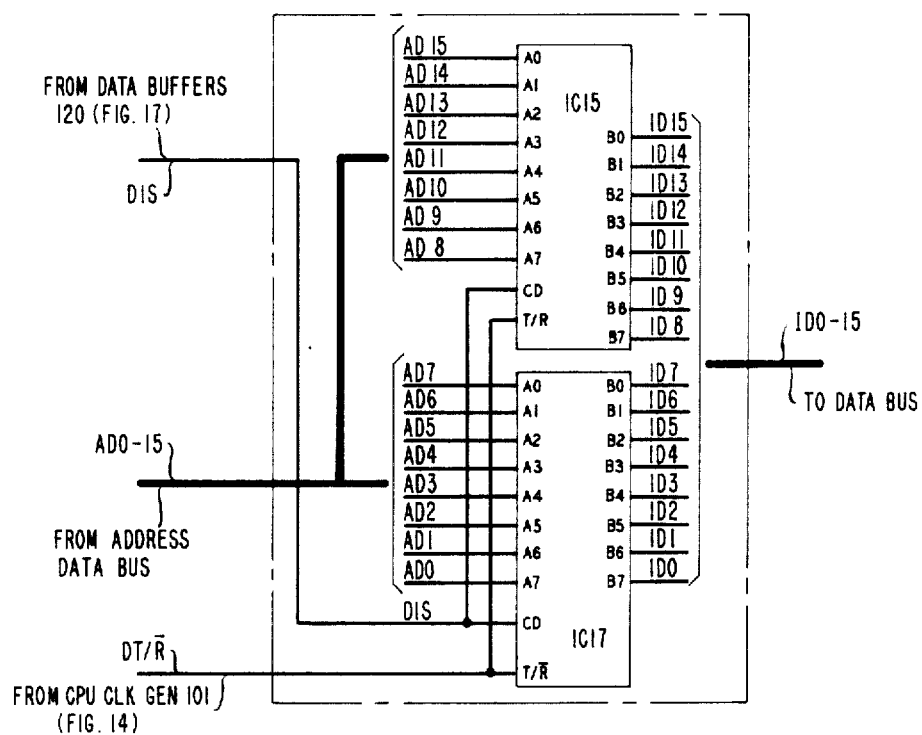

The 16 address/data bits from the microprocessor go to two pairs of bidirectional bus drivers shown in FIGS. 17 and 19. One pair, IC63 and IC64 (FIG. 17) connect to the 16-bit main data bus on the backplane. The other pair IC15 and IC17, FIG. 19, connect to an internal data bus ID0-15. The direction of transmission is controlled by an DT/R. A high on this lead indicates transmit (write to memory) and a low indicates receive or read. The two pairs have outputs enabled by complementary signals. The main data bus to AD bus connection is enabled when LS2=VMH=DEN=1.

Figure 11:
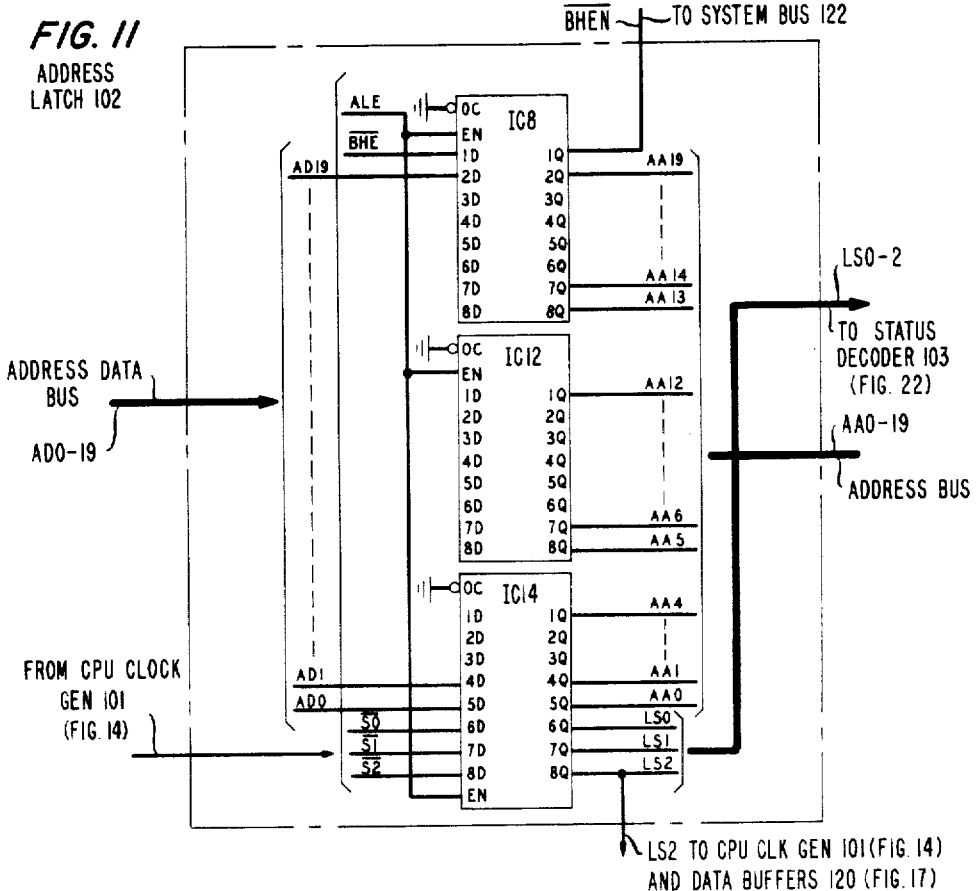
Figure 20:
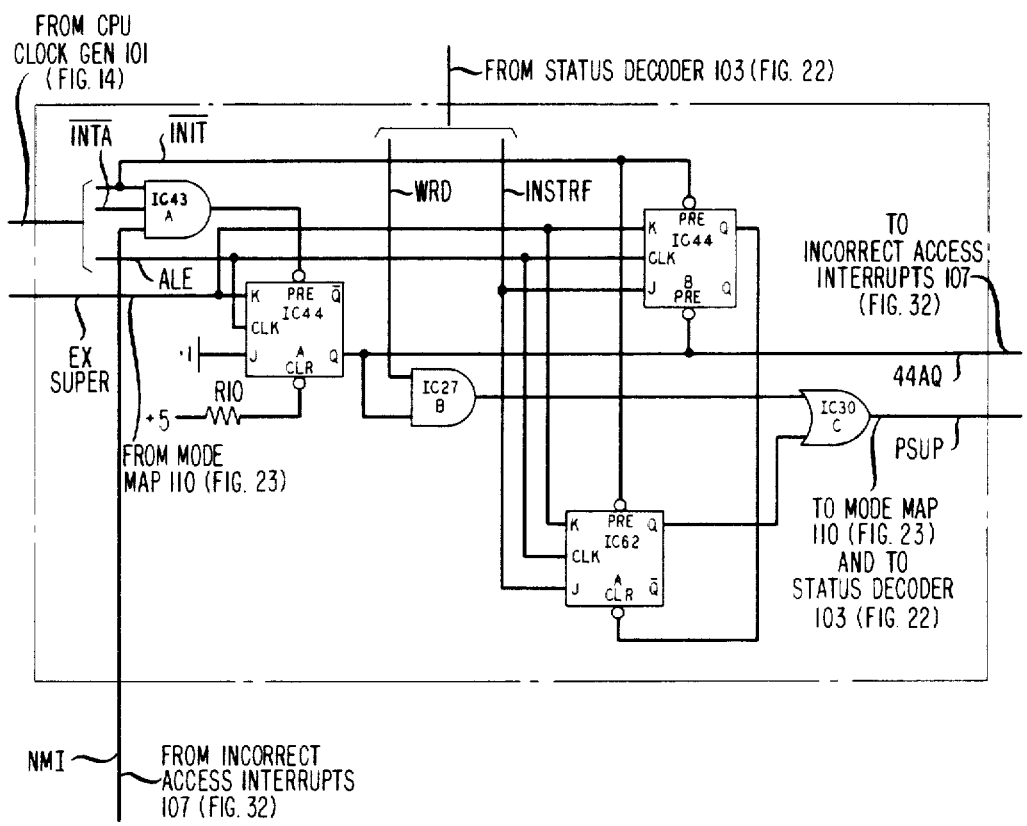
Figure 22:
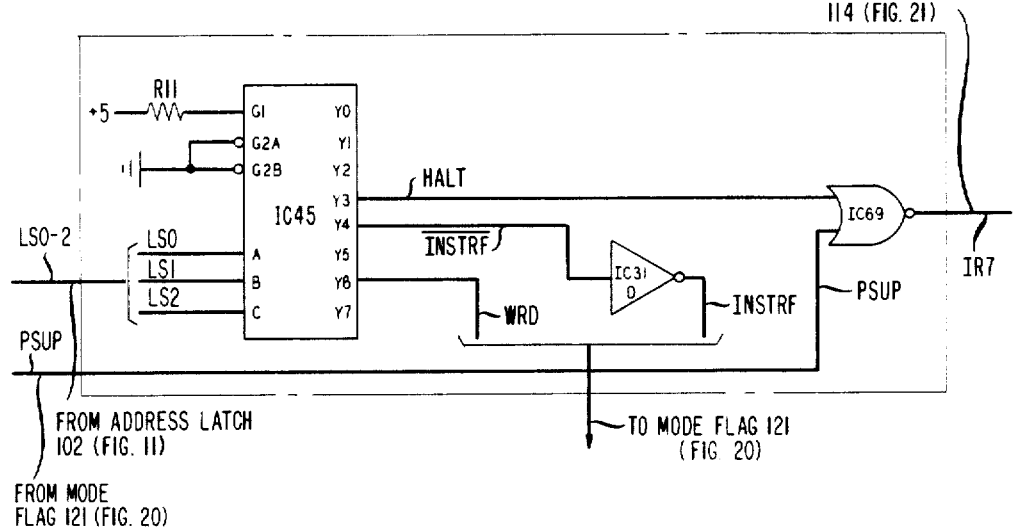

During the first clock period of a machine cycle, an ALE signal is generated by IC16 (FIG. 14) to latch the 20-address bits, the bus high enable bit, and 3 status bits into IC8, IC12, and IC14, FIG. 11. As shown in FIG. 20, the ALE pulse also clocks control signals into flip-flops IC44A and B and IC62A. As shown in FIG. 22, the 3 status outputs of IC14, LS0-2 are decoded by IC45 to give halt (HALT), instruction fetch (INSTRF), and write data to memory (WRD) indications. The bus high enable output of IC11, (BHEN), FIG. 14, along with address bit A0, are used by the memory board to select the proper bytes of the memory word to be read or written.

Figure 23:
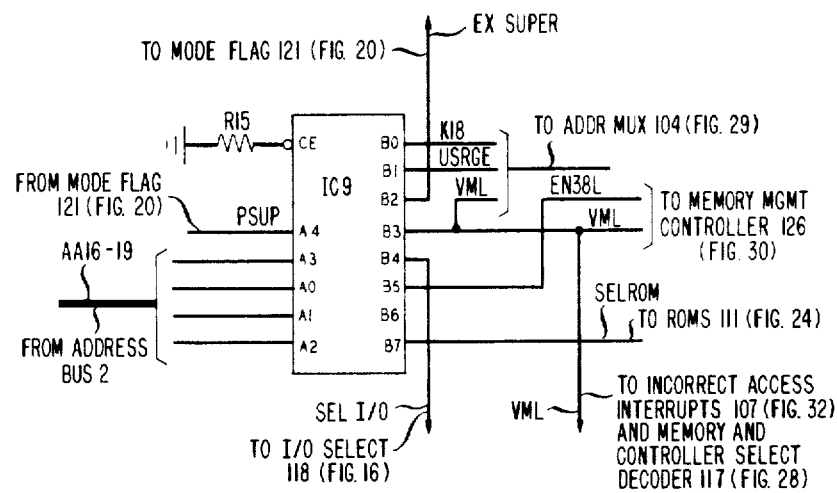
Figure 24:
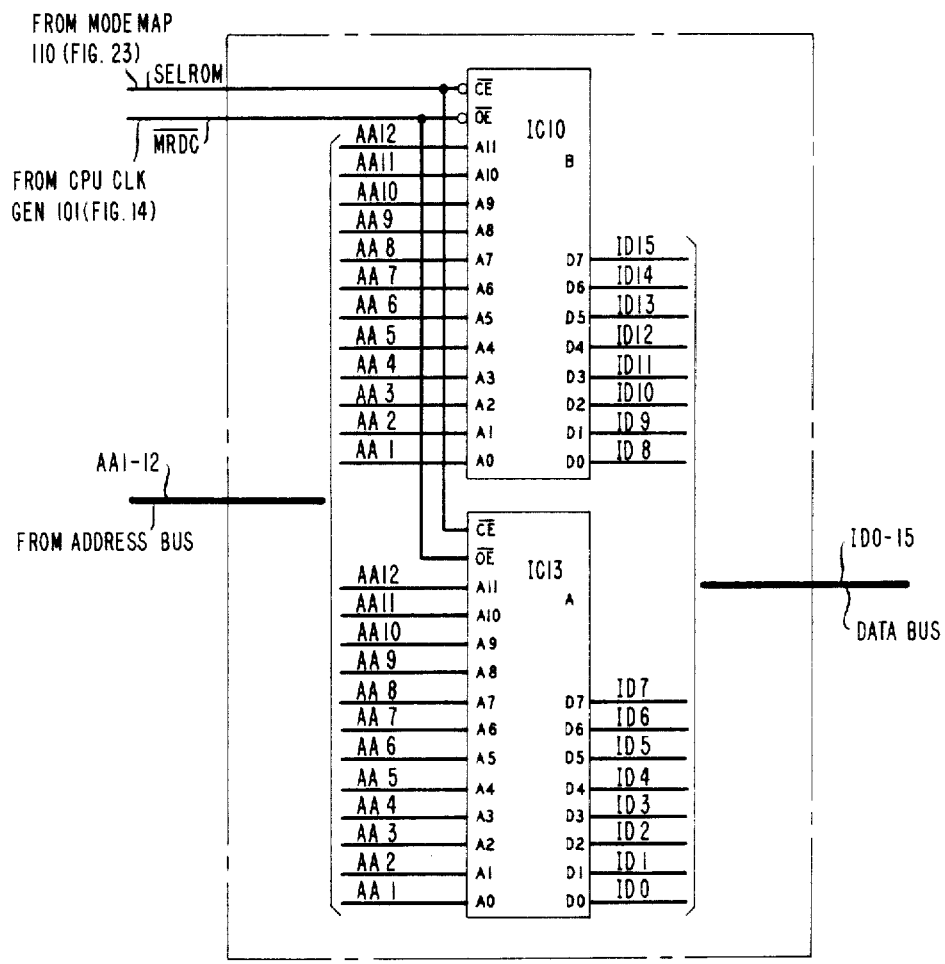

The 20 bits, AA0-19, address (AA1-AA12) two power up 4k×8 ROMS IC10 and 13, FIG. 24, and provide the input to the memory management circuitry. In addition, leads AA16-19 address mode map ROM IC9, FIG. 23. The contents of the mode map are shown in FIG. 25.

The memory management circuitry maps the 20 virtual address bits into a physical address space of 22 bits plus additional address space for memory mapped devices, a 256×32 memory management RAM and the power-up ROMs. The 256×32 RAM array, shown in FIG. 26, IC19, IC22, IC25 and 28 stores page address and page descriptor information. Sixteen bits, SA16-31, are added to 7 bits of the microprocessor address (AA4-6-AA12) and then combined with AA0-AA15 to form the 22-bit physical address A0-A21, as shown in FIG. 7, and is priorly discussed.

Figure 13:
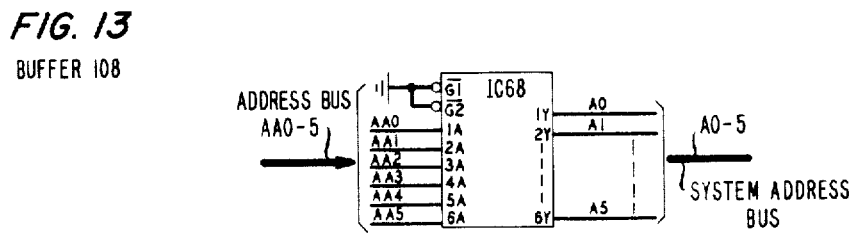
Figure 27:
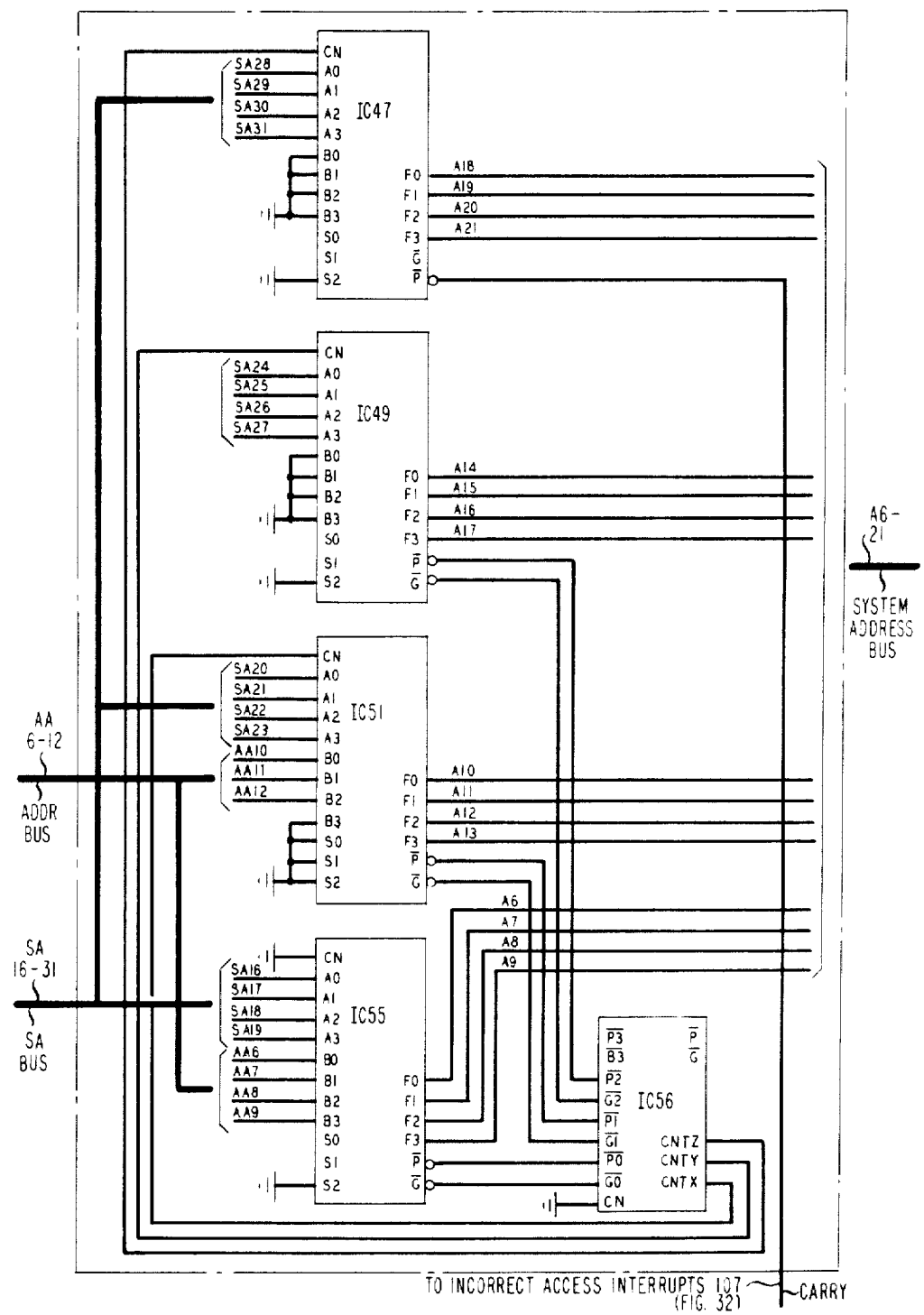

The address generation described above is implemented by adders IC47, IC49, IC51 and IC55 and a look ahead carry generator IC56 for A6-A21 shown in FIG. 27 and by buffer IC68, FIG. 13, for leads A0-A5. A carry signal out of IC47 is used to indicate that the address space has been exceeded. The page descriptor information SA0-15 is identified in FIG. 6. The use of these bits will be covered later.

The six highest order address bits are also used to generate memory select signals for the various memory and common controllers to eliminate separate decoding circuits on these units.

Figure 28:
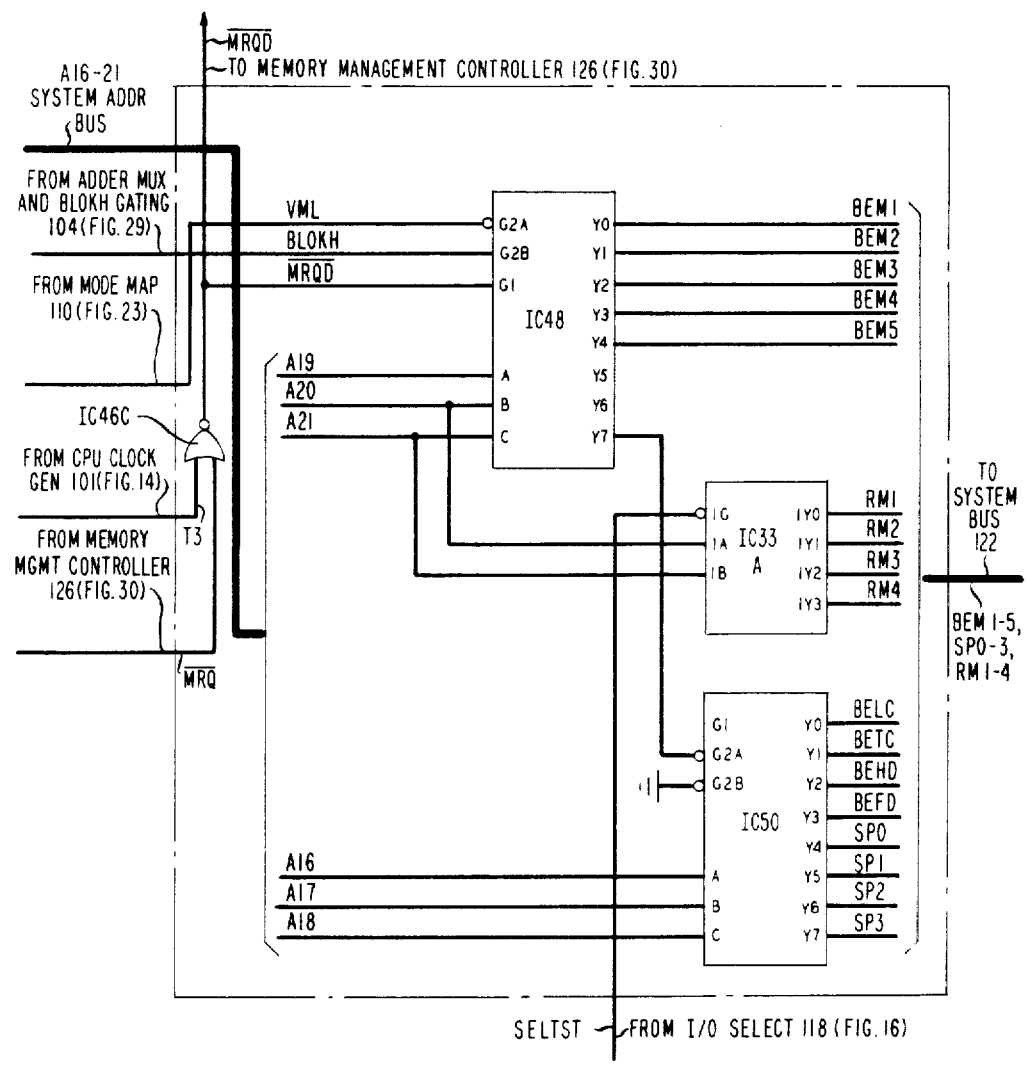

The above enable signals are generated by decoders IC33, 48 and 50, FIG. 28, from the address leads when the control signals VML=0, BLOKH=0, and MRQD=1.

The four highest order bits from the microprocessor, AA19-AA16, the memory maps, exit from kernel to user mode, access the memory management RAM and access various devices as shown in FIG. 5 and is priorly discussed.

Figure 16:
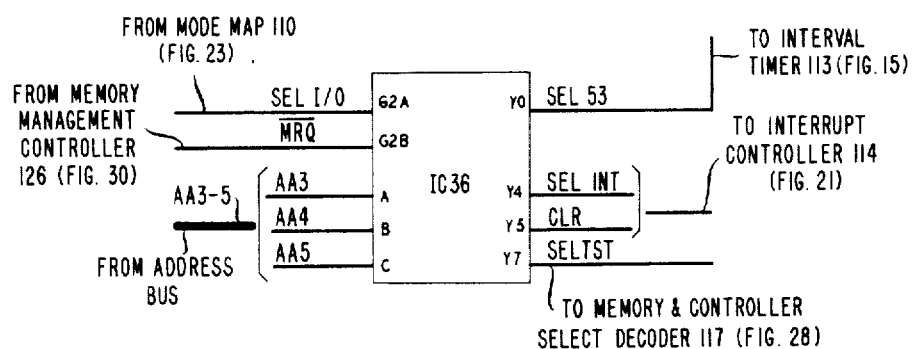

Mode map ROM IC9, FIG. 23, decodes AA1-9-AA16 and the mode flag to generate the control signals that perform the functions described in the preceeding paragraph. Leads AA16-19 and PSUP (PSUP=1 is the kernel mode) address the ROM. The output signals ae used as follows:

K18—addresses the memory management RAM and performs the multiple mapping of user blocks U0-U3 in user mode USRGE—A 1 indicates an illegal user attempt to access a kernel map or device EXSUPER—A 1 causes an exit from the kernel mode into the user mode VML—A 0 corresponds to an address translation and a memory access on the system bus SEL I/O—A 0 along with a memory request (MPQ=0) enables I/O select decoder IC36 FIG. 16 which selects either the USARTs, interval timer or interrupt controller EN38L—A 0 permits a read and write access to the memory management RAM SELROM—A 0 selects ROMs IC10 and 13 on power up, system reset or programmed access.

MODE MAP

The mode map ROM IC19 is shown in FIG. 23 and the contents of the mode map ROM are shown in FIG. 25, and the mode flag is shown in FIG. 20. On power-up or reset, initializing signal INT=0 which presets J-K flip-flops IC44A, IC44B and IC62A. The Q output of IC62A forces PSUP=1 which corresponds to the kernel mode. Unless the mode map ROM decodes the 1100 address to change to user mode, EXSUPER=0 and all Q outputs of the flip-flops remain 1 independent of the status of the J inputs to IC44B and IC62A. When the mode map decodes 1100, the address to exit the kernel mode, EXSUPER goes to a 1 level and is clocked into IC44A at the trailing edge of ALE. This sets the Q output of IC44A to 0 and clears IC44B, in turn clearing IC62A. The combination of cleared flip-flop outputs forces PSUP=0 which corresponds to user mode. The circuit remains in the user mode until an interrupt acknowledge (INTA=0) or nonmaskable interrupt (NMI=0) starts the switch to kernel mode.

During the interrupt sequence for either a NMI or standard interrupt, the processor writes data to the system memory at an address specified by an internal register in the processor called the stack pointer. Since the user program has full control over the stack pointer, the mode flag must not allow the writes that take place during the interrupt sequence to take place with the kernel mode access rights. Therefore, the switch between user and kernel mode must take place after the interrupt sequence but before the next instruction fetch memory access.

The interrupt acknowledge (INTA=0) signal presets JK flip-flop IC44A. This removes the clear signal from JK flip-flop IC44B, sends a 1 on lead 44AQ which disables the detection of interrupts being turned off. Preset IC44A makes PSUP=1 except during memory writes (WRD=0) when PSUP is controlled by JK flip-flop IC62A since IC44A's input to or gate IC30 is gated off by WRD=0 into IC27B. Now that IC44B is no longer forced clear by IC44A, IC44B is set by the next decoded instruction fetch (INSTRF=1) from IC31, FIG. 22, which is clocked into the J input by ALE. This instruction fetch is part of the interrupt sequence. Also during the interrupt sequence memory writes are made to the user stack. These memory writes are decoded by IC45, FIG. 22, (WRD=0) and make PSUP follow the Q output of IC62 which at this point is 0 which represents user mode. Making PSUP=0 during these memory writes protects the security of the system.

IC44B being set removes the clear signal from IC62A. IC62A is set by the next instruction fetch (INSTRF=1) which is clocked into its J input by ALE. This instruction fetch signifies the end of the interrupt sequence and is the fetch of the first instruction of the interrupt service routine in kernel mode. This instruction fetch is not a memory write (WRD=1) and thus PSUP is 1 since IC44A is set. Concurrently IC62A is set by this instruction fetch and all further memory accesses, including memory write, will take place with PSUP being 1, until the mode map ROM decodes a 1100 thereby changing the mode back to user as previously described.

Figure 26:
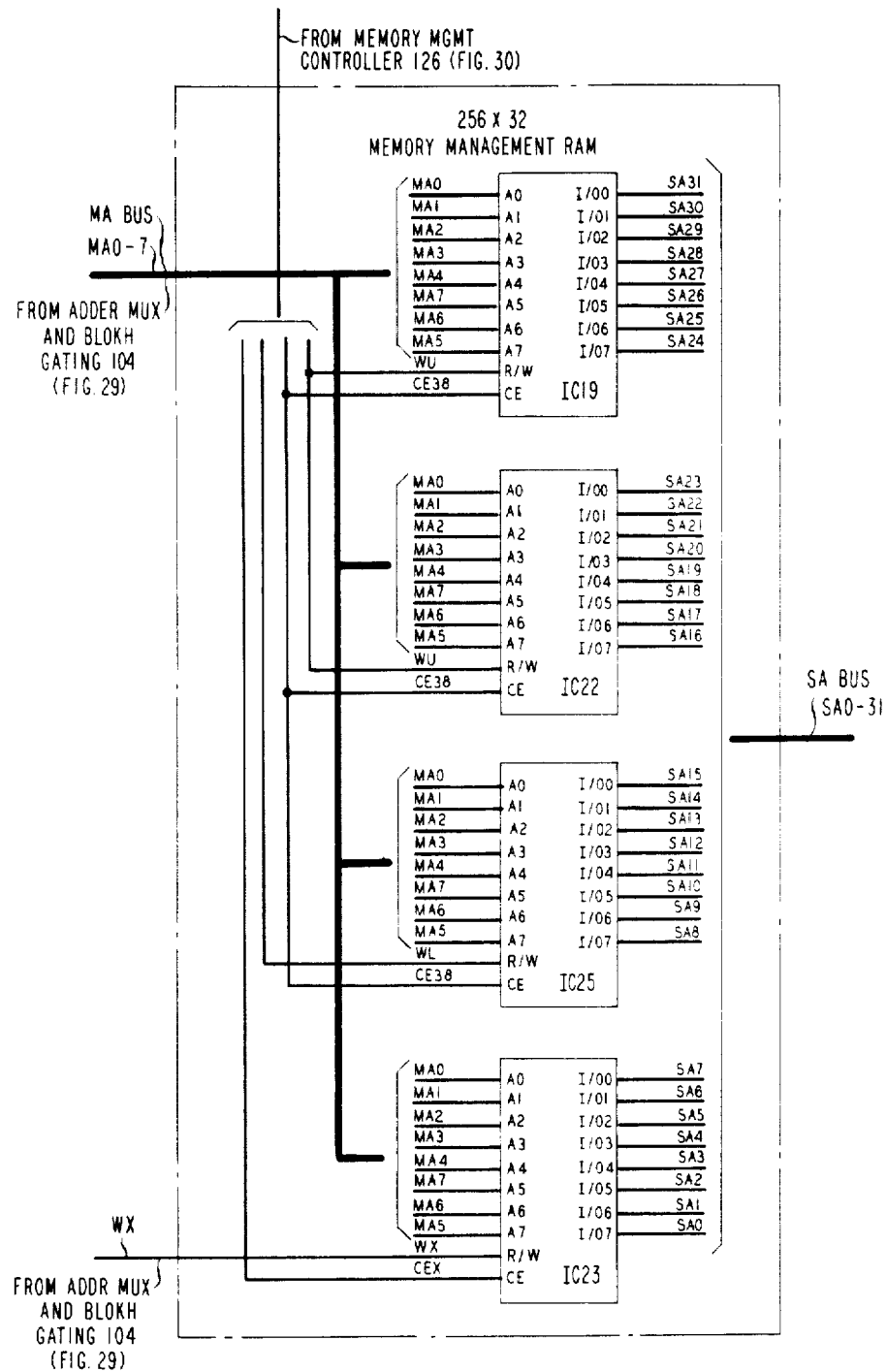
Figure 29:
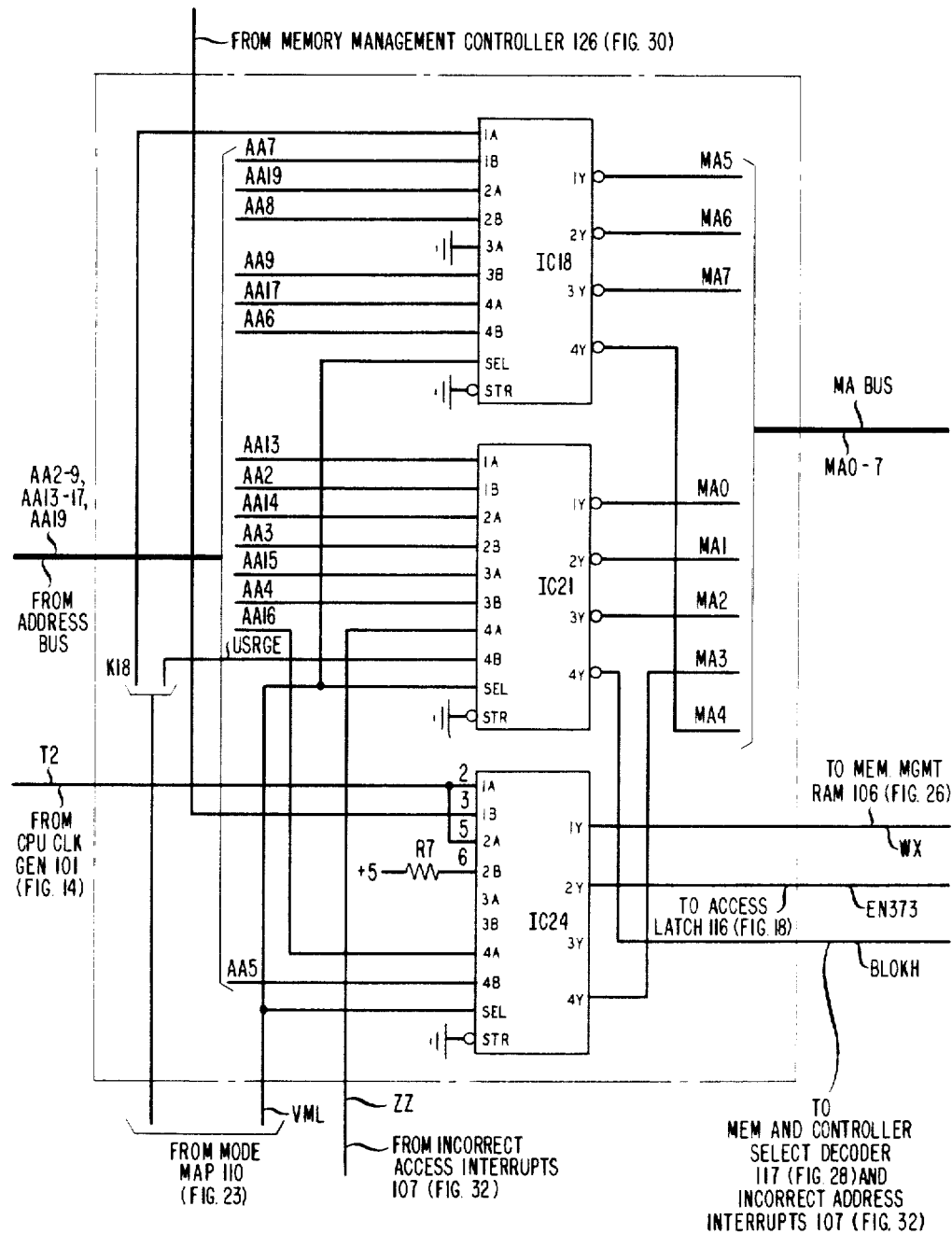

The 256×32 memory management RAM array, IC19, IC22, IC25, and IC28, FIG. 26, is addressed by one of the sets of signals selected by data multiplexers IC18, IC21 and IC24 as shown in FIG. 29. During main system memory accesses, VML=0, signals AA13-17, K18, AA19, 0 form the address. At all other times including a memory management write access, signals AA2-AA9 form the address. These lower order bits for addressing the memory management RAM permit the RAM to be addressed with sequential addresses.

Figure 18:
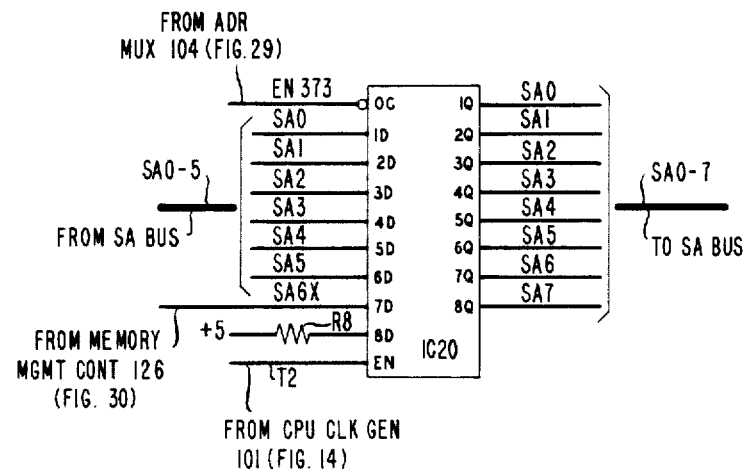
Figure 30:
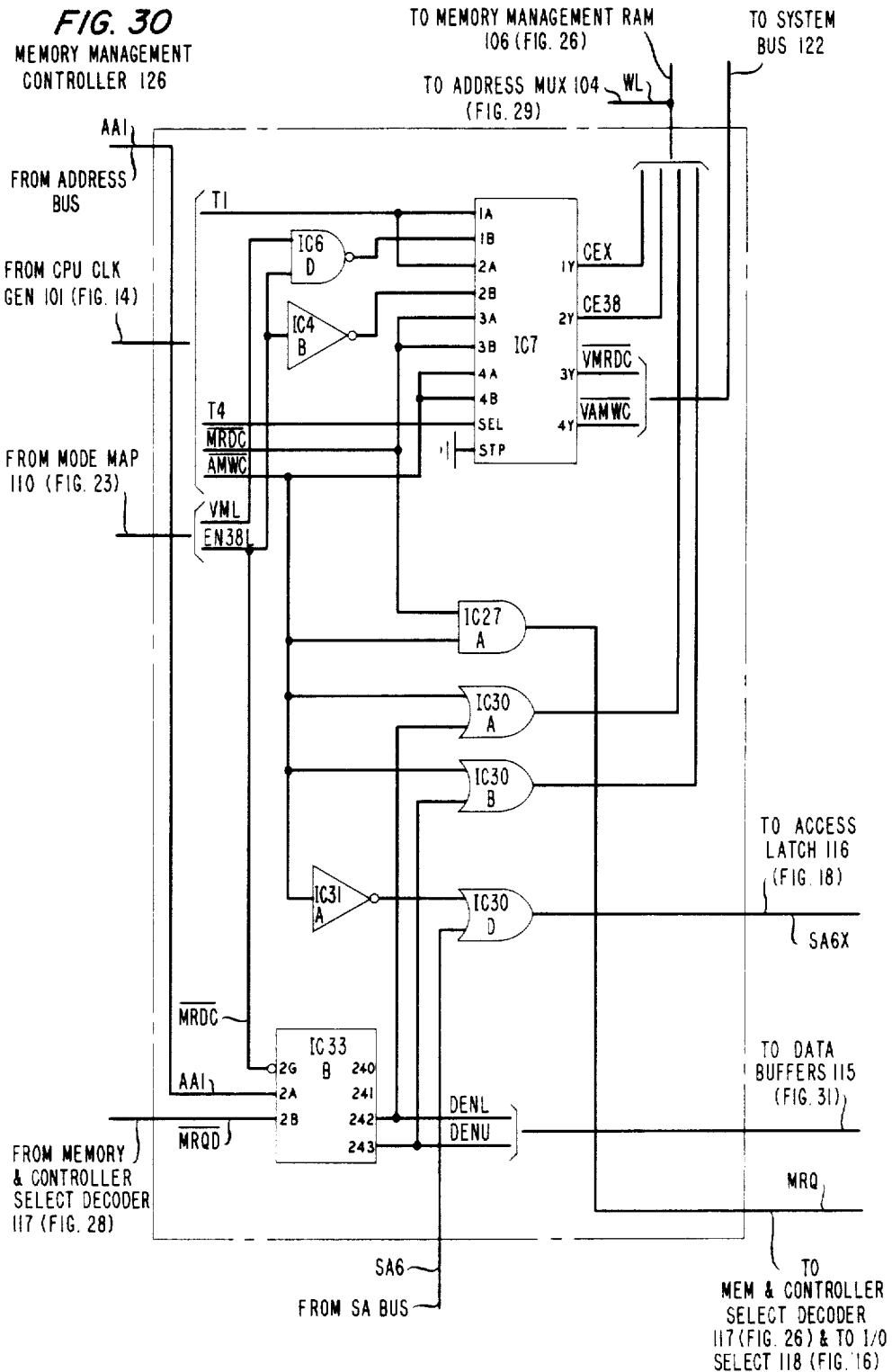

During main system memory accesses, EN38L=1 and demultiplexer IC33, FIG. 28, is disabled. Outputs DENL and DENU are held high, blocking potential writes to ¾ of the memory management RAM (MMRAM). Signals DENU and DENL also disable bidirectional buffers IC23, IC26, IC29 and IC32, FIG. 31, which tie together the internal data bus ID0-16, and the MMRAM data lines SA0-31. The write signals to the upper portion of MMRAM, WU and the second quarter of MMRAM, WL, are held high by gates IC30A and 30B, FIG. 30. When VML=0, IC28, FIG. 26, is written to at the end of T4. The purpose of rewriting the lower 8 bits during a memory access is to write SA7=1 if a page of memory has been accessed and SA6=1 if a page has been written to. The other bits are rewritten unchanged. During a memory access, the SA0-5 output of IC28 is latched in IC20, FIG. 18, by EN373 going low at the end of a T2 pulse. If the memory is being written to AMWC=0 or SA6=1 (a previous write to memory), SA6X=1 is latched. A 1 is also latched for SA7 to indicate a memory access. The latched data is then written into IC28 (FIG. 26) by the combination of write (WX) and chip enable (CEX) signals. The WX signal is T2 when VML=0. The CEX signal is a combination of T1 and T4 pulses generated by multiplexer IC6 (FIG. 30). The enable to the other three RAMs CE38 is basically T1.

Figure 31:
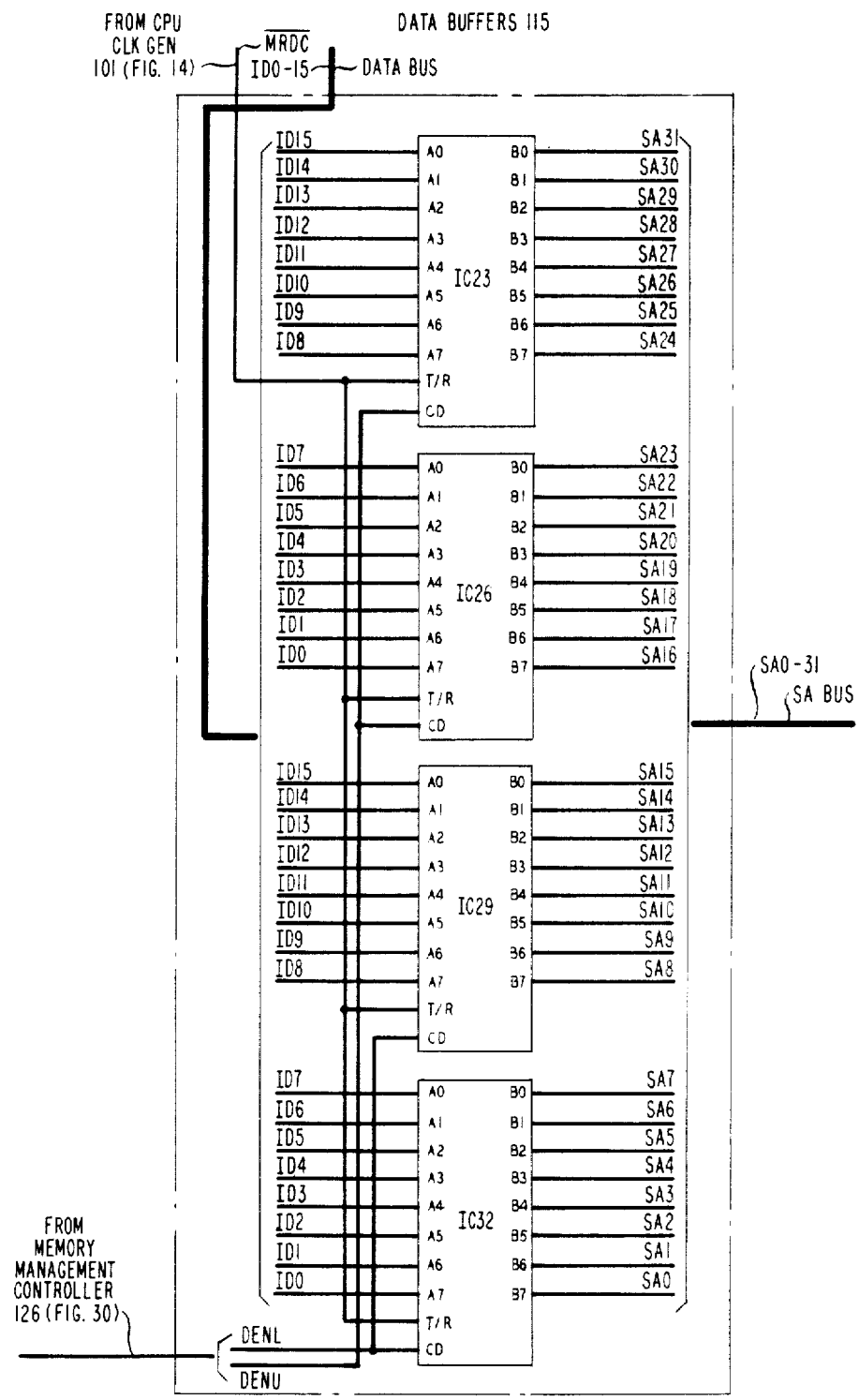

During a memory management read/write access VML=1 and EN38L=0. The addresses to the RAMs are AA2-9 and A1 selects the upper half (DENU=0) or lower half (DENL=0) via decoder IC33B (FIG. 30). The den signals are enabled by MRQD=1 and in turn enable bidirectional buffers IC23 and IC26 or IC29 and IC32 (FIG. 31). On memory reads (MRDC=1) the SA leads are the input and ID lead the output. At other times the data flow is in the opposite direction. The memory writes data from the internal data bus ID-0-ID15 when WU=CE38=0 for IC19 and 22, when WL=C38 for IC25, and when WX=CEX=0 for IC28 (FIG. 26).

The interval timer, IC34, is loaded and read via the internal data bus lines ID0-7. Two of the outputs provide clocks to the USARTs and the third output provides a periodic interrupt to the interrupt controller for maintaining a real time clock. Note that the third output assures a regular return from user mode to kernel mode.

Figure 14:
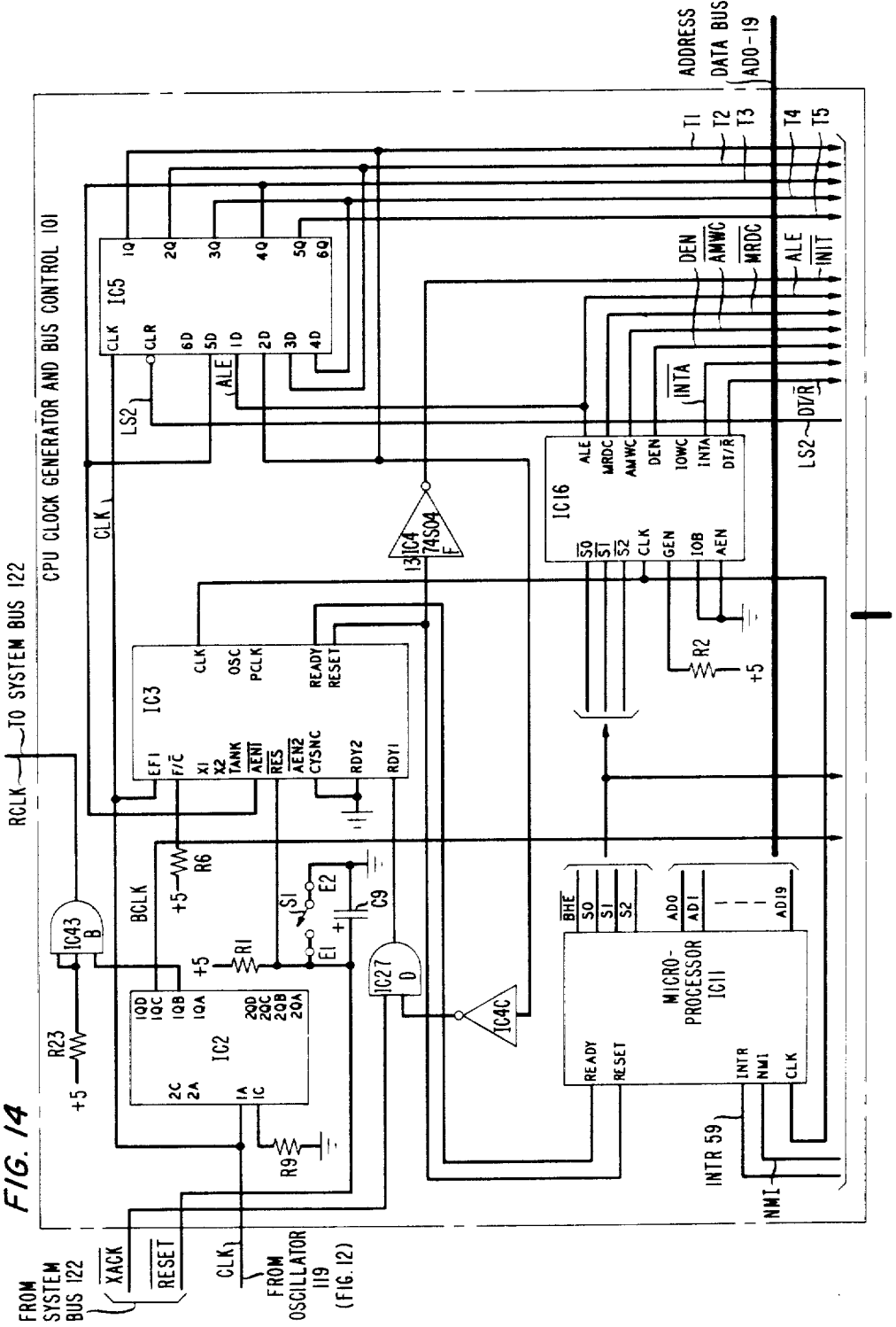
Figure 15:
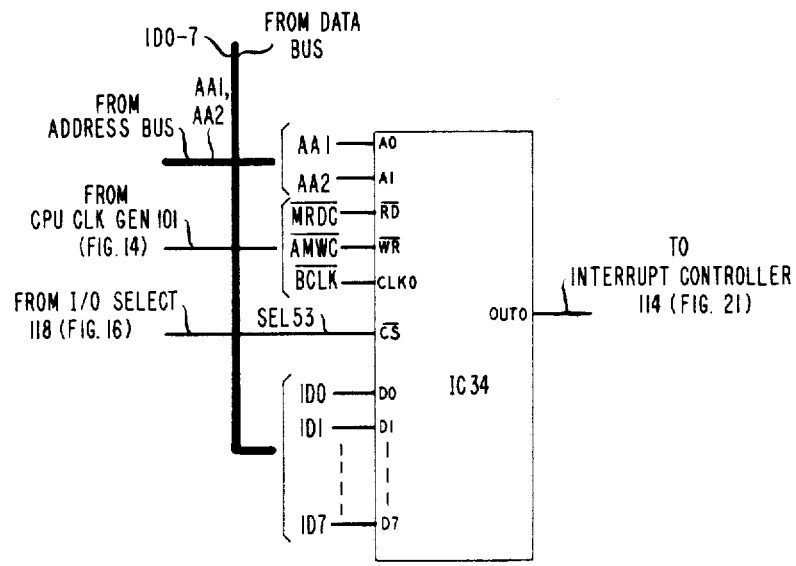
Figure 21:
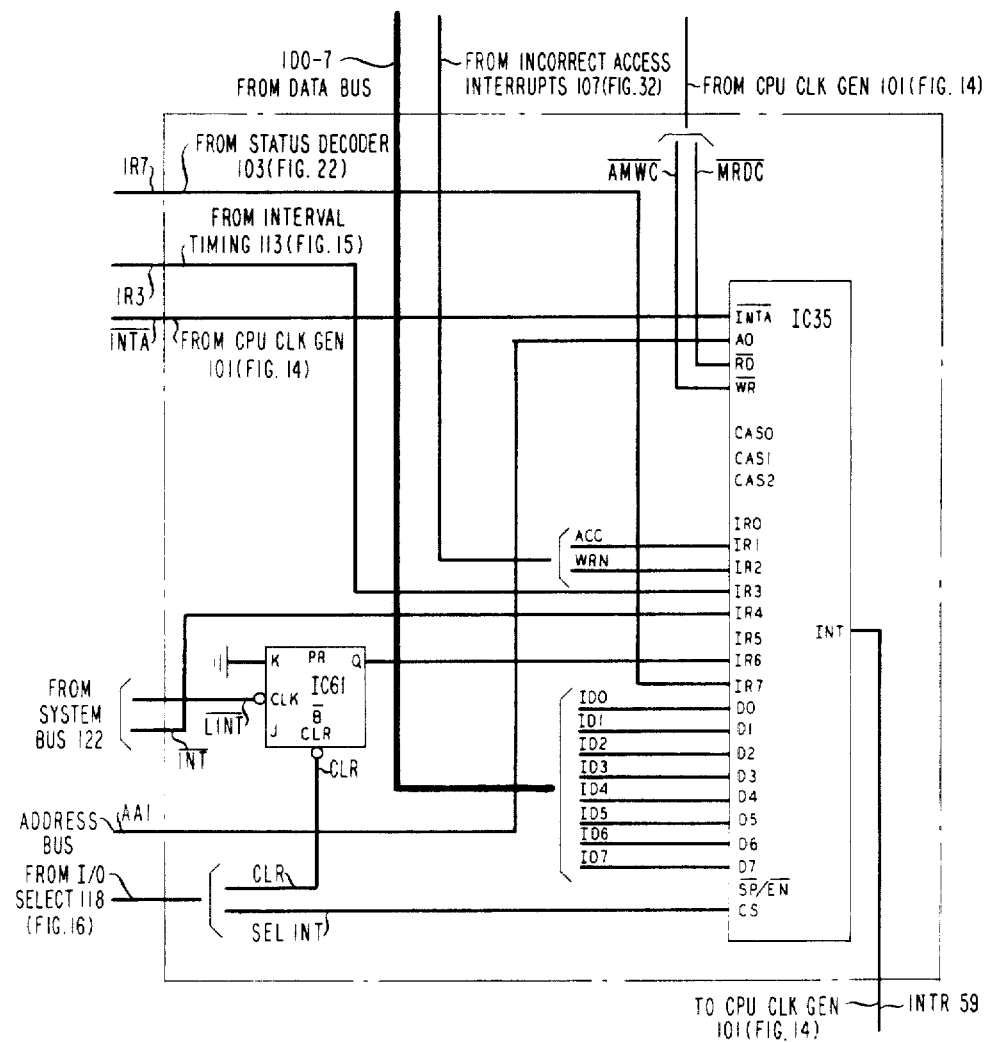

The programmable interrupt controller IC35 (FIG. 21) handles up to eight vectored priority interrupts for the CPU. If one of the interrupt request lines IR0-7 are raised high IC35 evaluates the request and sends an INT=1 to the microprocessor (FIG. 14). The CPU acknowledges with an INTA=0 which freezes the state of the interrupts for priority resolution. On a second INTA=0 pulse IC35 will send a byte of data to the processor via ID0-7.

Interrupt IR3 is a periodic interrupt from the interval timer. Interrupt IR4 is from the hard disk controller while IR6 is from all of the remaining peripheral controller interrupts. Interrupt IR7 is an interrupt from the status decoder indicating that the processor halted.

Figure 32:
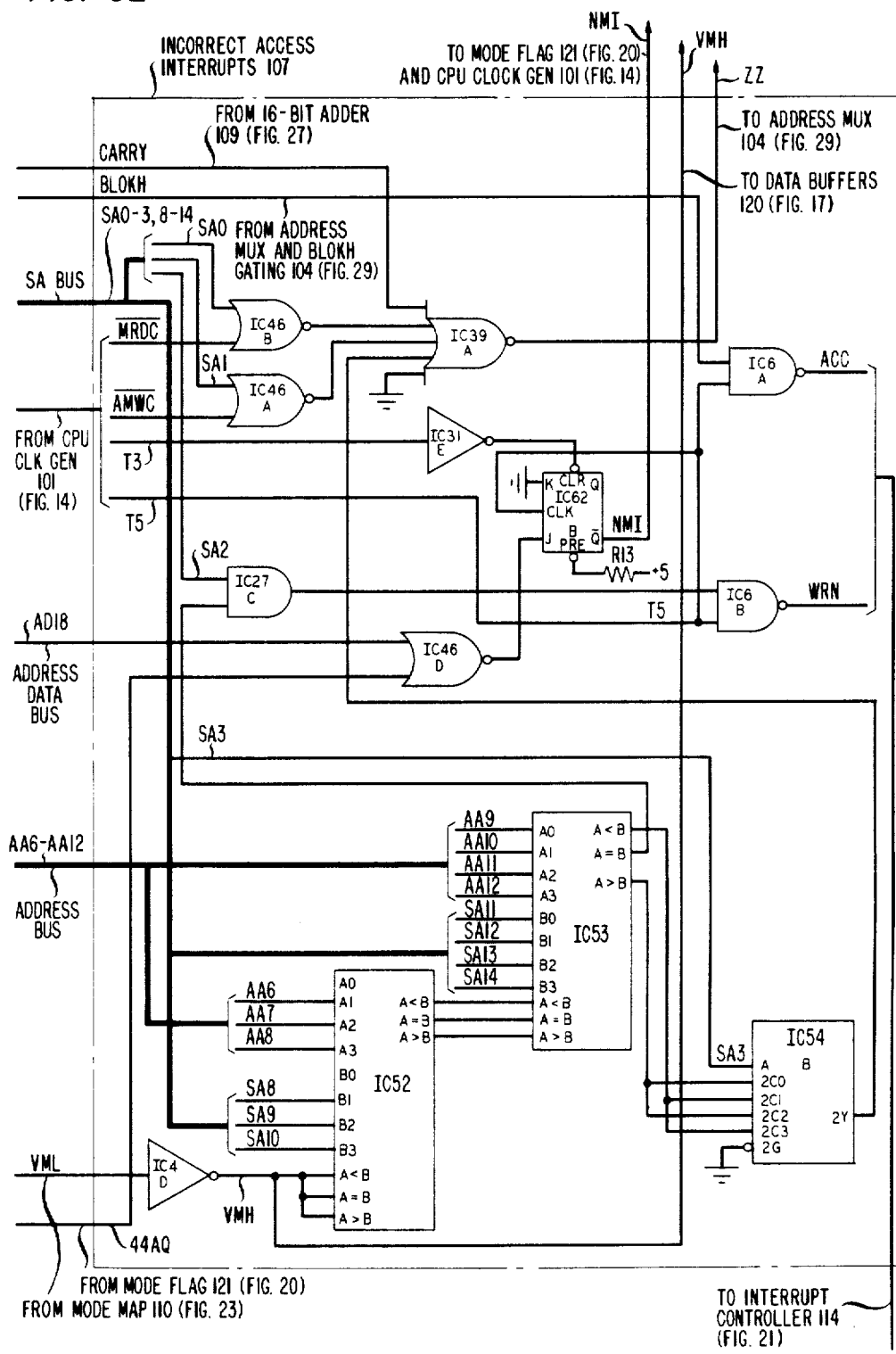

There are a number of memory access situations that cause interrupts. Comparators IC52 and IC53 (FIG. 32) give a 1 output to the input IC27C when the page size (SA8-14) equals the present address bits AA6-A12 to indicate that the last permitted page of memory is being accessed. If the warning bit SA2=1, the output of IC27C is 1 and at T5 a warning interrupt, WRN, will be given that no more than 64 additional addresses can be accessed unless more space is allocated. Signal WRN is interrupt IR2. The A<B and A>B outputs of IC53 serve as inputs to selector IC54. The output selection is made by SA3 (SA3=0 expand up; SA3=1 expand down). If the page memory is exceeded either upward (A>B output=1, SA3=0) or downward (A<B output=1, SA3=1), the signal SAE=1. Signal SAE is one of 4 inputs to nor gate IC39A (FIG. 32). If any of the inputs go high, the output ZZ goes low. During memory accesses VML=0 and ZZ is inverted in data selector IC21 (FIG. 29) to become the BLOKH signal. A BLOKH=1 (ZZ=0) signal disables decoder IC48 (FIG. 28) thus blocking system memory and controller enable signals and preventing memory accesses. The BLOKH=1 signal also causes interrupt IR1 through signal ACC. A memory read MRDC=0 without read permission (SA0=0) will cause the output of IC46A (FIG. 32) to go high, also forcing ZZ=0 and an ACC interrupt. Similarly a memory write AMWC=0 without write permission (SA1=0) causes the output of IC46B (FIG. 32) to go high, forcing ZZ=0 and an ACC interrupt. Finally a carry from the adder (FIG. 27) indicating that the total address capability of the system has been exceeded causes ZZ=0 and an ACC interrupt.

CONCLUSION

While the above-described circuit is shown to operate in conjunction with a particular microprocessor, it is to be understood that the concepts taught herein may be applied to any microprocessor or processor without department from the spirit and scope of my invention.

What is claimed is:

1. A circuit for use in conjunction with a single user single mode processor, said processor having a set of pre-established input and output leads and operable for executing instruction sets, and operable in response to an interrupt signal for jumping from the instruction set currently being executed to a different instruction set under control of a vector address provided from an external memory, said circuit arranged to provide multi-user processing capability and comprising means for establishing within said circuit at least first and second modes of operation, means for dividing said external memory into blocks, means for controlling said memory such that certain of said memory blocks are accessible by instructions executed by said processor while said circuit is in said first mode and certain of said memory blocks are accessible by instructions executed by said processor while said circuit is in said second mode, said establishing means includes first means for switching from said first mode to said second mode under control of an interrupt, and second means for switching from said second mode to said first mode by decoding output bits from said processor.

2. The invention set forth in claim 1 wherein said second means includes means for receiving bits from said processor on said address output leads of said processor.

3. The invention set forth in claim 1 wherein said interrupt causes said processor to jump to a pre-established address in the portion of said memory accessible while said circuit is in said second mode.

4. The invention set forth in claim 2 wherein said pre-established address is obtained from a particular location within the portion of said external memory accessible by instructions executed while said circuit is in said first mode.

5. The invention set forth in claim 1 wherein said processor operates to send data to memory addresses controlled by a register internal to said processor, and wherein said circuit includes
means for delaying the establishment of said second mode until data in said processor at the time of said interrupt has been processed.

6. The invention set forth in claim 1 wherein said processor is further arranged to respond to certain signals to disable said interrupt signals, and
wherein said circuit further comprises means for inhibiting said disabling of said interrupt signals when said processor is executing instructions in said first mode while still allowing said interrupt signals to be disabled when said processor is operating in said second mode.

7. The invention set forth in claim 5 wherein said inhibiting means includes a flag register having at least one bit set either for said first or second modes, and
means for comparing, on each instruction execution, bits on certain output leads of said processor against said at least one bit of said flag register.

8. The invention set forth in claim 7 further comprising means operable when said certain of said processor output bits match said at least one flag register bit for providing an interrupt to said processor.

9. The invention set forth in claim 1 wherein said processor is arranged, in response to certain signals, to halt the execution of instructions, and
means controlled by said circuit and responsive to the mode of said circuit for automatically restarting said processor after a half signal.

10. The invention set forth in claim 9 wherein said restarting means includes a flag register having at least one bit set either for said first or second modes, and
means for comparing, on each instruction execution, bits on certain output leads of said processor against said at least one bit of said flag register.

11. The invention set forth in claim 10 further comprising means operable when said certain of said processor output bits match said at least one flag register bit for providing an interrupt to said processor.

12. The invention set forth in claim 1 wherein said memory is divided into sections, each section assigned to a particular user, and
means, including bytes within a memory map, for controlling access to said memory sections.

13. The invention set forth in claim 12 wherein said memory map bytes are placed in said memory map only when said processor is executing instructions while said circuit is in said second mode.

14. A multi-user processing system comprising a microprocessor operable for executing instructions and for communicating with external memory over a set of output address leads and data leads,
means for establishing kernel and user system operation modes, wherein said kernel mode has full system privileges while said user mode has restricted system privileges, and
means external to said microprocessor for switching from said user mode to said kernel mode under control of interrupt signals provided to said microprocessor and for switching from said kernel mode to said user mode by decoding information contained on said microprocessor output address leads.

15. The invention set forth in claim 14 further comprising
memory management means containing bytes of information to be used for memory access control, and
means for directing data to and from said external memory in accordance with an address derived in part from information supplied from said microprocessor output address leads and in part from said memory management means information bytes.

16. The invention set forth in claim 15 wherein said memory management means contains a plurality of memory address ranges and corresponding access permissions thereto all of which access permissions are usable when in said kernel mode while only some of said access permissions are usable when in said user mode.

17. The invention set forth in claim 16 wherein said microprocessor operates to provide an interrupt acknowledge signal upon starting an interrupt sequence in response to receipt of one of said interrupt signals, and operates to perform operations during said interrupt sequence, and wherein said external mode switching means includes,
means responsive to said interrupt acknowledge signal for counting certain of said operations during an interrupt,
means for counting microprocessor operations, and
means for restricting said access permissions to the plurality of said access permissions usable in said user mode until a predetermined number of microprocessor operations have been counted.

18. The invention set forth in claim 16 wherein said microprocessor operates to provide an interrupt acknowledge signal upon starting an interrupt sequence in response to receipt of one of said interrupt signals, and operates to perform operations during said interrupt sequence, and wherein said external mode switching means includes,
means responsive to said interrupt acknowledge signal for restricting said access permissions for processor write operations to the plurality of said access permissions usable in said user mode until a number of microprocessor operations have occurred while concurrently allowing other processor operations to have full access to all of said permissions.

19. The invention set forth in claim 15 wherein said system includes means for accessing all of said memory blocks when said system is in said kernel mode and for limiting memory access to only certain blocks of said memory when said system is in said user mode.

20. The invention set forth in claim 19 further comprising means for controlling said memory such that at least one block of said memory is readable while said system is in said user mode and writable only while said system is in said kernel mode.

21. The invention set forth in claim 14 wherein said microprocessor is further arranged to respond to certain signals to disable said interrupt signals, and wherein said system further comprises means for inhibiting said disabling of said interrupts signals when said microprocessor is executing instructions in said user mode while still allowing said interrupts to be disabled when said microprocessor is operating in said kernel mode.

22. The invention set forth in claim 21, wherein said inhibiting means includes a flag register having bits set either for said first or second modes, and means for comparing, on each instruction execution, bits on certain output leads of said microprocessor against bits of said flag register.

23. The invention set forth in claim 22 further comprising means operable when certain of said microprocessor output bits match said flag register bits for providing an interrupt to said microprocessor.

24. The invention set forth in claim 14 wherein said microprocessor is arranged in response to certain signals, to halt the execution of instructions, and wherein said system includes means for restarting a halted microprocessor when a halt signal is received while said system is in said user mode.

25. The invention set forth in claim 24 wherein said restarting means includes a flag register having bits set either for said first or second modes, and means for comparing, on each instruction execution, bits on certain output leads of said microprocessor against bits of said flag register.

26. The invention set forth in claim 25 further comprising means operable when certain of said microprocessor output bits match said flag register bits for providing an interrupt to said microprocessor.

27. The invention set forth in claim 14 wherein said microprocessor operates to provide an interrupt acknowledge signal upon starting an interrupt sequence in response to receipt of one of said interrupt signals and operates to perform operations during said interrupt sequence, and wherein said external mode switching means includes, means responsive to said interrupt acknowledge signal for counting certain of said operations during an interrupt sequence, and means for delaying said switching from said user to said kernel modes until a predetermined number of microprocessor operations have been counted.

28. A circuit for use in conjunction with a microprocessor, said microprocessor having a set of pre-established output address leads and a fixed set of other input and other output leads, said microprocessor operable to execute programs one instruction at a time, said circuit comprising means controlled by bits on certain of said address leads for establishing first and second circuit modes, a mode register having a first state when said circuit is in said first mode, and a second state, when said circuit is in said second mode, means for comparing the state of certain of said other output leads against said mode register state, and means for providing an interrupt signal to said microprocessor when both said compared states match and when said mode register is in said first state.

29. The invention set forth in claim 28 wherein said microprocessor has an interrupt mask and wherein the state of said certain microprocessor output leads is an indication of the state of said interrupt mask.

30. The invention set forth in claim 28 wherein said mode establishing means includes a memory mode map addressable by said bits on said certain address leads for changing said circuit from said second mode to said first mode.

31. The invention set forth in claim 30 wherein said mode establishing means further includes means responsive to interrupt signals for changing from said first to said second states.

32. The invention set forth in claim 28 wherein said circuit further includes means for establishing distinct files within a memory, and means controlled jointly by said mode establishing means and said distinct file establishing means for controlling access to said files.

* * * * *